(12) United States Patent
Krishnamurthy et al.

(10) Patent No.: US 11,687,230 B2
(45) Date of Patent: *Jun. 27, 2023

(54) MANIPULATING 3D VIRTUAL OBJECTS USING HAND-HELD CONTROLLERS

(71) Applicant: Purdue Research Foundation, West Lafayette, IN (US)

(72) Inventors: Vinayak Raman Krishnamurthy, West Lafayette, IN (US); Cecil Piya, West Lafayette, IN (US); Karthik Ramani, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,651

(22) Filed: Jan. 10, 2022

(65) Prior Publication Data
US 2022/0137808 A1   May 5, 2022

Related U.S. Application Data

(63) Continuation of application No. 16/077,212, filed as application No. PCT/US2017/017262 on Feb. 9, 2017, now Pat. No. 11,221,750.
(Continued)

(51) Int. Cl.
*G06F 3/04883* (2022.01)
*G06F 3/04845* (2022.01)
(Continued)

(52) U.S. Cl.
CPC .......... *G06F 3/04883* (2013.01); *G06F 3/017* (2013.01); *G06F 3/0346* (2013.01);
(Continued)

(58) Field of Classification Search
CPC .... G06F 3/04883; G06F 3/017; G06F 3/0346; G06F 3/04845; G06T 19/006; G06T 19/20; G06T 2219/2016
See application file for complete search history.

(56) References Cited

U.S. PATENT DOCUMENTS 5,666,473 A    9/1997  Wallace
6,831,640 B2   12/2004 Shih et al.
(Continued)

FOREIGN PATENT DOCUMENTS

CN    201374736 Y    12/2009
CN    102647511 A     8/2012
(Continued)

OTHER PUBLICATIONS

Babu, et al., "Sketching in Air: A Single Stroke Classification Framework", ASME 2014 International Design Engineering Technical Conferences and Computers and Information in Engineering Conference, Aug. 2014, pp. V02AT03A005-V02AT03A005.
(Continued)

*Primary Examiner* — Rodney Amadiz
(74) *Attorney, Agent, or Firm* — Maginot, Moore & Beck LLP

(57) ABSTRACT

Some examples provides a set of frameworks, process and methods aimed at enabling the expression and exploration of free-form and parametric 3D shape designs enabled through natural interactions with a hand-held mobile device acting as a controller for 3D virtual objects. A reference plane in a virtual space generated by the location of the mobile device may be used to select a 3D virtual object intersected by the reference plane. Positioning of the mobile device may also be used to control a pointer in the virtual space. In an example, the orientation of the mobile device may be detected by an accelerometer or gyroscope. In example, the
(Continued)

position of the mobile device may be detected by a position sensor.

17 Claims, 30 Drawing Sheets

Related U.S. Application Data

(60) Provisional application No. 62/294,837, filed on Feb. 12, 2016.

(51) Int. Cl.
    *G06T 19/20*     (2011.01)
    *G06T 19/00*     (2011.01)
    *G06F 3/0346*   (2013.01)
    *G06F 3/01*     (2006.01)

(52) U.S. Cl.
CPC ........ *G06F 3/04845* (2013.01); *G06T 19/006* (2013.01); *G06T 19/20* (2013.01); *G06T 2219/2016* (2013.01)

(56) References Cited

U.S. PATENT DOCUMENTS

| | | | |
|---|---|---|---|
| 7,212,197 | B1 | 5/2007 | Schkolne et al. |
| 7,289,121 | B1 | 10/2007 | Balakrishnan et al. |
| 7,683,883 | B2 | 3/2010 | Touma et al. |
| 8,456,466 | B1 | 6/2013 | Reisman et al. |
| 8,479,543 | B2 | 7/2013 | Yang et al. |
| 8,902,181 | B2 | 12/2014 | Hinckley et al. |
| 8,947,429 | B2 | 2/2015 | Fowler et al. |
| 8,994,736 | B2 | 3/2015 | Carr et al. |
| 2004/0233223 | A1 | 11/2004 | Schkolne et al. |
| 2011/0041098 | A1 | 2/2011 | Thomas et al. |
| 2013/0271579 | A1 | 10/2013 | Wang |
| 2013/0314320 | A1 | 11/2013 | Hwang et al. |
| 2014/0168128 | A1 | 6/2014 | Reisman et al. |
| 2015/0074611 | A1 | 3/2015 | Kontkanen |
| 2015/0363980 | A1* | 12/2015 | Dorta .................. G06F 3/04883 345/419 |

FOREIGN PATENT DOCUMENTS

| | | |
|---|---|---|
| JP | 2004259065 A | 9/2004 |
| WO | 2011003171 A1 | 1/2011 |
| WO | 20130600085 A1 | 5/2013 |
| WO | 2013109245 A1 | 7/2013 |
| WO | 2013165440 A1 | 11/2013 |

OTHER PUBLICATIONS

Bacim, et al., "Design and evaluation of 3D selection techniques based on progressive refinement", Human-Computer Studies, vol. 71, No. 7-8, Mar. 2013, pp. 785-802.
Baerenlzen, et al., "Interactive Shape Modeling using a Skeleton-Mesh Co-Representation", ACM Trans. Graph, vol. 33, No. 4, 2014.
Balakrishnan, et al., "Exploring Interactive Curve and Surface Manipulation Using a Bend and Twist Sensitive Input Strip", Proceedings of the 1999 Symposium on Interactive 3D Graphics, vol. 13D, 1999, pp. 111-118.
Becker, et al., "Brushing Scatterplots", Technometrics, vol. 29, No. 2, May 1987, pp. 127-142.
Benzina, et al., "Phone-Based Motion Control in VR—Analysis of Degrees of Freedom", ACM Extended Abstracts on Human Factors in Computing Systems, May 2011, pp. 1519-1524.
Berge, et al., "Design and Evaluation of an "Around the SmartPhone" Technique for 3D Manipulations on Distant Display", retrieved at «http://dl.acm.org/citation.cfm7id2788941», SUI '15 Proceedings of the 3rd Symposium on Spatial User Interaction, Aug. 8-9, 2015, ACM, pp. 69-78.
Berge, et al., "Exploring Smartphone-Based Interaction with Overview+ Detail Interfaces on 3D Public Displays", 8 Proceedings of the ACM International Conference on Human-Computer Interaction with Mobile Devices & Services, pp. 125-134. Sep. 23, 2014.
Bertolo, et al., "A Set of Interaction to Rotate Solids in 3D Geometry Context", ACM Extended Abstracts on Human Factors in Computing Systems, May 2013, pp. 625-630.
Bloomenthal, "Calculation of Reference Frames along a Space Curve", Academic Press Professional, Inc., vol. 1, pp. 567-571. Jul. 1993.
Boring, et al., "Scroll, Tilt or Move It: Using Mobile Phones to Continuously Control Pointers on Large Public Displays", ACM Australian Computer-Human Interaction Special Interest Group, Nov. 2009, pp. 161-168.
Bouget, "Pyramidal Implementation of the Affine Lucas Kanade Feature Tracker Description of the algorithm", Intel Corporation, vol. 5, No. 1, pp. 1-10. 2000.
Bowman, et al., "An Evaluation of Techniques for Grabbing and Manipulation Remote Objects in Immersive Virtual Environments", Proceedings of 1997 Symposium on Interactive 3D Graphics, vol. 13D, 1997, pp. 35-ff.
Buja, et al., "Interactive Data Visualization using Focusing and Linking", Proceedings of the 2nd Conference on Visualization, Vis 91, 1991, pp. 156-163.
Cohe, et al., "Understanding user gestures for manipulating 3D objects from touchscreen inputs", Proceedings of the ACM SIGCHI Conference on Human Factors in Computing Systems, May 2012, pp. 3005-3008.
de Kraker, et al., "Maintaining multiple views in feature modeling", Proceedings of the Fourth ACM Symposium on Solid Modeling and Applications, SMA '97, 1997, pp. 123-130.
Debarba, et al., "Disambiguation Canvas: a precise selection technique for virtual environments", Human-Computer nleraction, vol. 8119, 2013, pp. 388-405.
Decle, et al., "A Study of Direct Versus Planned 3D Camera Manipulation on Touch-Based Mobile Phones", Proceedings of the ACM Conference on Human-Computer Interaction with Mobile Devices and Services, September OQ9, pp. 32:1-32:5.
Fuge, "Conceptual design and modification of freeform surfaces using dual shape representations in augmented reality Environments", Computer-Aided Design, vol. 44, No. 10, 2012, pp. 1020-1032.
Grossman, et al., "An Interface for Creating and Manipulating Curves using a High Degree-of-Freedom Curve Input Device", ACM Conference on Human Factors in Computing Systems, Apr. 2003, pp. 185-192.
Hincapie-Ramos, "Consumed Endurance: A Metric to Quantity Arm Fatigue of Mid-Air Interactions", Proceedings of the ACM SIGCHI Conference on Human Factors in Computing Systems, Apr. 2014, pp. 1063-1072.
Hinckley, et al., "Passive Real-World Interface Props for Neurosurgical Visualization", Proc. SIGCHI, Apr. 1994, pp. 452-458.
Isenberg, et al., "Collaborative Brushing and Linking for Co-localed Visual Analytics of Document Collections", compuer Graphics Forum, vol. 28, No. 3, 2009, pp. 1031-1038.
Jacob, et al., "Integrality and Separability of Input Devices", ACM Trans. Comput-Hum. Interact, vol. 1, No. 1, Mar. 1994, pp. 3-36.
Jerald, et al., "Make VR: A 3D World-Building Interface", IEEE Symposium on 3D User Interfaces, Mar. 2013, pp. 197-198.
Katzakis, et al., "Plane-Casting: 3D Cursor Control With A SmartPhone", ACM Asia Pacific Conference on Computer Human Interaction, Sep. 2013, pp. 199-200.
Keefe, et al., "Drawing on Air: Input Techniques for Controlled 3D Line Illustration", IEEE Transactions on Visualization and Computer Graphics, vol. 13, pp. 1-13. Mar. 19, 2007.
Keim, "Information Visualization and Visual Data Mining", IEEE Transactions on Visualization and Computer Graphics, vol. 7, No. 1, Mar. 2002, pp. 100-107.
Kin-Chung Au, et al., "Multitouch Gestures for Constrained Transformation of 3D Objects", Comput. Graph Forum., vol. 31, No. 2, 2012, pp. 651-661.

(56) References Cited

OTHER PUBLICATIONS

Knoedel, "Multi-Touch RST in 2D and 3D Spaces: Studying the Impact of Directness on User Performance", IEEE Symposium on 3D User Interfaces, Mar. 2011, pp. 75-78.
Kristensson, et al., "SHARK: A Large Vocabulary Shorthand Writing System for Pen-based Computers", ACM Symposium on User Interface Software and Technology, Oct. 2004, pp. 43-52.
Lakatos, et al., "T(ether): Spatially-Aware Handhelds, Gestures and Proprioception for Multi-User 3D Modeling and Animation", ACM Symposium on Spatial User Interaction, Oct. 2014, pp. 90-93.
Lazarus, et al., "Axial deformations: an intuitive deformation technique", Computer-Aided Design, vol. 28, No. 8, Aug. 2004, pp. 607-613.
Leigh, et al., THAW: Tangible INteraction with See-Through Augmentation for Smarthphones on Computer Screens, ACM Conference on Tangible, Embedded, and Embodied Interaction, Jan. 2015, pp. 89-96.
Liang, et al., "User-defined Surface+Motion Gesutres for 30 Manipulation of Objects at a Distance through a Mobile Device", ACM Asia Pacific Conference on Computer Human Interaction, Aug. 2012, pp. 299-308.
Llamas, et al., "Twister: A Space-Warp Operator for the Two-Handed Editing of 3D Shapes", ACM Trans. Graph, vol. 2, No. 3, 2003, pp. 663-669.
Lue, et al., "3D Whiteboard: Collaborative Sketching with JD-Tracked Smart Phones", vol. 9012, 2014, pp. 901204-901204, 12.
Medeiros, et al., "A Tablet-Based 3D Interaction Tool for Virtual Engineering Environments", ACM SIGGRAPH Conference on Virtual-Reality Continuum and Its Applications in Industry, Nov. 2013, pp. 211-218.
Mine, et al., "Making VR Work: Building a Real-World Immersive Modeling Application in the Virtual World", ACM Symposium on Spatial User interaction, Oct. 2014, pp. 80-89.
Mossel, et al., "3DTouch and HOMER-S: Intuitive Manipulation Techniques! for One-Handed Handheld Augmented Reality", retrieved at «http://dl.acm.org/citation.cfm?id2466829», VRIC '13 Proceedings of the Virtual Reality International Conference: Laval Virtual Article No. 12, Mar. 20-Feb. 21, 2013, 10 pages.
Murugappan, et al., "Fesay: A Sketch-Based Interface Integrating Strucural Analysis in Early Design", ASME 2009 International Design Engineering Technical Conferences and Computers and Information in Engineering Conference, Sep. 2009, pp. 743-752.
Nancel, et al., "High-Precision Pointing on Large Wall Displays using Small Handheld Devices", Conference on Human Facotrs in Computing Systems, May 2013, pp. 831-840.
Ortega, et al., "Direct Drawing on 3d Shapes with Automated Camera Control", Proceedings of the SIGCHI Conference on Human Factors in Computing Systems, May 2014, pp. 20147-2050.
Paczkowski, "Paper3D: Bringing Casual 3D Modeling to a Multi-Touch Interface", ACM Symposium on User Interface Software and Technology, Oct. 2014, pp. 23-32.
PCT Search Report and Written Opinion dated May 18, 2017 for PCT Application No. PCT/US17/17262, 13 pages.
Pihuit, et al., "Hands-on Virtual Clay", IEEE Conference on Shape Modeling and Applications, Jun. 2008, pp. 267-268.
Piya, et al., "Proto-Tai: Quick Design Prototyping Using Tangible Assisted Interface", ASME IDETC/CIE, Aug. 2014, pp. 1-10.
Pu, et al., "Priority-Based Geometric Contraint Satisfaction," Journal of Computing and Information Science in Engineering, vol. 7, No. 4, pp. 322-329. Dec. 2007.
Scheible, "MobiSpray: Mobile Phone as Virtual Spray Can for Painting BIG Anytime Anywhere on Anything", ACM SIGGRAPH 2009 Art Gallery, vol. 42, No. 4, Aug. 2009, pp. 332-341.
Schkolne, et al., "Surface Drawing: Creating Organic 3D Shapes with the Hand and Tangible Tools", ACM Conference on Human factors in computing systems, Apr. 2004, pp. 261-268.
Schmidt, et al., "On Expert Performance in 3D Curve-Drawing Tasks", Proceedings of the 6th Eurographics Symposium on Sketch-Based Interfaces and Modeling, Aug. 2009, pp. 130-140.
Schwarz, "Combining Body Pose, Gaze, and Gesture to Determine Intention to interact Vision-Based Interfaces", Proc. CHI, May 2014, pp. 3443-3452.
Sheng, et al., "An Interface for Virtual 3D Sculpting via Physical Proxy", ACM International Conference on Computer Graphics and Interactive Techniques in Australasia and Southeast Asia, Nov. 2006, pp. 213-220.
Song, et al., "A Handle Bar Metaphor for Virtual Object Manipulation with Mid-Air Interaction", Proc. CHI, May 2012, pp. 1297-1306.
Song, et al., WYSIWYF: Exploring and Annotating Volume Data with a Tangible Handheld Device", Proceedings of the ACM SIGCHI Conference on Human Factors in Computing Systems", May 2011, pp. 1333-1342.
Takala, et al., "Immersive 3D modeling with Blender and off-the-shelf hardware", IEEE Symposium on 3D User Interfaces,2013,pp. 191-192.
Teather, et al., "Position vs. Velocity Control for Till-Based Interaction", Graphics Interface Conference, May 2014, pp. 51-58.
Telkenaroglu, et al., "Dual-Finger 3D Interaction Techniques for mobile devices", Personal Ubiquitous Conference, vol. 17, Sep. 2012, pp. 1551-1572.
Tsandilas, et al., "Coordination of Till and Touch in One and Two Handed Use", ACM Conference on Human Factors n Computing Systems, Apr. 2014, pp. 2001-2004.
Vinayak, et al., "Hand GRasp and Motion for Intent Expression in Mid-Air Virtual Pottery", Proceedings of the 41 st Graphics Interface Conference, Jun. 2015, pp. 49-57.
Vinayak, et al., "zPols: A Virtual Pottery Experience Through Spatial Interactions Using the Leap Motion Device", CHI 14 Extended Abstracts on human Factors in Computing Systems, Apr. 2014, pp. 371-374.
Wang, et al., "6D Hands: Markerless Hand Tracking for Computer Aided Design", ACM Symposium on Spatial User Interaction, Oct. 2011, pp. 549-558.
Wang, et al., "Coordinated 3D Interaction in Tablet- and HMD—Based Hybrid Virtual Environments", ACM Symposium on Spatial User Interaction, Oct. 2014, pp. 70-79.
Xin, et al., "Napkin Sketch—Handheld Mixed Reality 3D Sketching", ACM Symposium on Virtual Reality Software and Technology, Oct. 2008, pp. 223-226.

* cited by examiner

Searching for parts from database

Assembling parts in virtual space

Menu navigation on mobile device

Tilt-touch gestures

FIG. 15 a. Shape Creation b. Shape Modification c. Shape Manipulation

MANIPULATING 3D VIRTUAL OBJECTS USING HAND-HELD CONTROLLERS

This application is a continuation application of U.S. patent application Ser. No. 16/077,212, filed on Aug. 10, 2018, which is a national stage application of International Patent Application No. PCT/US2017/017262, filed Feb. 9, 2017, which claims priority to U.S. Provisional Patent Application No. 62/294,837 filed Feb. 12, 2016, the disclosures of which are each hereby incorporated herein by reference in their entireties.

GOVERNMENT LICENSE RIGHTS

This invention was made with government support under contract numbers CMMI-1235232 and CMMI-1329979 awarded by the National Science Foundation. The government has certain rights in the invention.

BACKGROUND

Currently, product design and manufacturing are the purview of enterprises and professionals such as engineers and artists. Everyone has ideas but only a select few can bring them to reality. The direct manipulation of content on touch-enabled devices is inherently two-dimensional (2D). The design of 3D objects is still predominantly implemented through 2D WIMP (Windows-Icons-Menus Pointers) based design metaphors that require extensive training, and inhibit the ability of users to create, manipulate, and modify virtual shapes in a straightforward manner. This is a tremendous waste of untapped human creative resources and economic potential to the society and world economy.

BRIEF DESCRIPTION

Some examples describes a set of frameworks, process and methods aimed at enabling the expression, manipulation, and exploration of 3D free-form shape designs enabled through interactions between a human practitioner and a mobile device (such as a smartphone or a tablet computer) that is held by the practitioner. In an example embodiment, we demonstrate how users can directly create, modify, and compose 3D swept surfaces through tilt and touch interactions on the mobile phone. In another example, clay like objects are created and manipulated like they would be expected to behave by humans. Finally in another embodiment, all these individual shape interactions are brought together in an environment, where multiple objects with different behaviors co-exist in one environment. In all these interactions of the embodiments, the shape, the mobile controller, and the contexts interact creating a virtual environment and objects in it that behave intelligently.

This summary is provided to introduce the selection of concepts in a form that is easy to understand the detailed embodiments of the descriptions. The embodiments are then brought together in a final embodiment which described an environment, thereby stressing that each of the embodiments may be viewed in isolation, but also the synergies among them are very significant. This summary is not intended to identify key subject matter or key features or essential features thereof.

BRIEF DESCRIPTION OF THE SEVERAL VIEWS OF THE DRAWINGS

The above and other objects, features, and advantages of various examples will become more apparent when taken in conjunction with the following description and drawings wherein identical reference numerals have been used, where possible, to designate identical features that are common to the figures, and wherein:

FIG. 15 illustrates six gestures (row 1) that enable the interactions across three modeling states: Configure (row 2), Author (row 3), and Manipulate (row 4). (0F, 1F, 2F, and 3F denote 0, 1, 2, and 3 finger gestures respectively).

DETAILED DESCRIPTION

Figure 1:
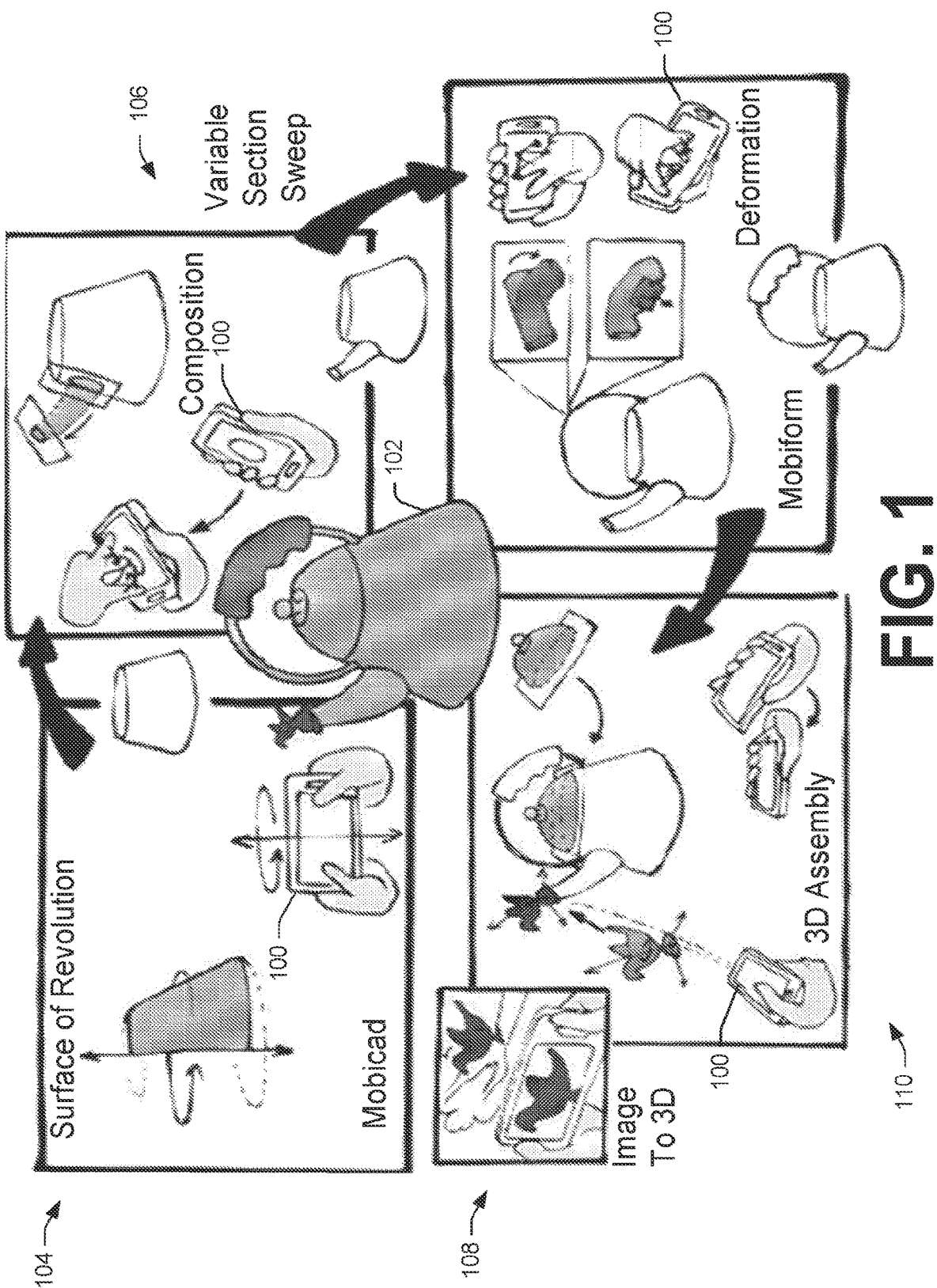
FIG. 1 illustrates the integration of mobile interaction metaphors using tilt-touch techniques for intuitive shape conceptualization.

The term "drawings" used herein refers to drawings attached herewith and to sketches, drawings, illustrations, photographs, or other visual representations found in this disclosure. The terms "I," "we," "our" and the like throughout this disclosure do not refer to any specific individual or group of individuals.

Existing computer-aided-design (CAD) tools were developed in the computer as a tool paradigm, where it serves as a passive vessel for design. These methods failed to fully leverage the computer-as-a-partner approach where the digital medium is treated as an active participant in a creative design process. This leaves great room for shape modeling interactions to explore the possibilities, true potential, and impact of using mobile devices towards shape modeling and design conceptualization.

The integration of a variety of sensors into smartphones provides new affordances for designing interactive processes to use our knowledge in and of the world towards creative on-the-fly shape modeling processes. Various aspects herein refer to example processes, solely for clarity of illustration, as "MobiSpace," "MobiSpray," "MobiCAD," "MobiSweep," "MobiForm," "MobiSpace," or "MobiSpin." Specifically-named example configurations are not limiting, and portions or the entireties of any number of the named techniques can be combined together or with other examples described herein.

The ubiquity of mobile devices has led to a disruptive change in the way users create, manipulate, and share digital information. Methods for using mobile phones as mid-air input devices in virtual environments have been recently proposed. Current research on mid-air mobile interactions has mainly focused on 3D object manipulation (rotation and translation), virtual scene navigation, and scientific visualization. The unique advantage of using smartphones is that they can be used as portable hand-held controllers that extend our mind and body, to create, manipulate, and modify virtual 3D objects on larger screens, personal computers, augmented and virtual reality. Mobile technologies provide additional new affordances for rotational and touch interactions on the surface, and when integrated with other external sensors or devices can provide affordances for additional new smart shape modeling interaction paradigms. Using the mobile devices we now design new interaction metaphors together with processes and supporting algorithms to simplify once complex WIMP-based CAD operations. We envision simple spatial interactions for easy direct shape modeling operations by transforming our bodily motions and rotations of the phone and contextual sketches on the devices to desired configurations and geometries.

Instead of merely extending our human capabilities with the digital platform, some examples provide ways to augment them, thereby reducing the need for formalized workflows in traditional CAD that inhibit creation and require expert-level knowledge (which requires special training to acquire).

Some examples are related to building a framework of embodied interactions for creation, manipulation, modification, and behavior of three-dimensional shapes. Some examples enable both quick as well as detailed construction of shapes for application domains ranging such as engineering design, product design, industrial design, and digital three-dimensional art.

Mobile spatial user interfaces (M-SUI's) have received significant research focus towards 3D manipulation, navigation and design on large-screen public displays, immersive environments, and mixed-reality setups. Mobile devices offer a unique combination of computational power, wireless data communication, 3D sensing capabilities, ergonomic manipulability, and multi-touch input mechanisms that can be instrumental in enabling embodied interactions for shape conceptualization and exploring new design work-flows.

FIG. 1 illustrates an example of using a smartphone 100 can be used to create a shape of a kettle 102 involving embodied interactions with the phone 100 to create a revolved feature 104, a variable section sweep 106, reuse through image-based modeling 108, and assembly 110 all through direct interactions using metaphorical canvas and a laser pointer. The perceived affordances of such design metaphors can transform the process of externalization of creative ideas through physically relatable human actions. Throughout this disclosure, references to creating objects can refer to creating shapes of those objects or data representing such shapes, unless otherwise indicated. Other hand-held or portable computing devices can be used instead of or in addition to smartphone 100.

Instrumented controllers such as gloves, hand-held trackers, and haptics devices, have been extensively studied in the context of mid-air art and design. Others have developed "Shape Tape" a specialized high degree-of-freedom controller for 3D curve input. Recently, commercial gaming controllers and customized hardware have also been demonstrated for 3D modeling. While commercial controllers offer accessibility, tailoring them towards modeling applications requires hardware design to add to their generic hardware features such as position, orientation, and buttons for expressing mouse clicks. Using a mobile phone 100 as a controller takes advantage of off-the-shelf accessibility and the possibility of a richer interface on the controller itself Existing works have shown the use of a tablet or a phone as a hand-held controller that helps the user select and manipulate (translate, rotate, scale) a 3D object displayed either on a large screen or a head-mounted display or HMD. Using the tilt of the mobile device has been most commonly used for 3D interactions. The multi-touch capability of mobile devices provides additional capabilities for both direct and indirect manipulations of the virtual objects. To this end, combination of touch and tilt interactions have been utilized for precise object selection, scene navigation, and immersive interactions. A study identified the best tilt-touch combinations in terms of user performance, motor coordination, and user preferences. Similar interactions have also been utilized within 3D exploratory applications such as volumetric data annotation and scientific visualization. Some examples herein permit performing shape creation or deformation tasks that, unlike rigid transformations, are location and shape specific. The ability to approach, reach, and deform an object varies as the intended location of modification changes. Further, the spatiality of interactions also leads to physical fatigue that is common in mid-air interaction approaches. Thus, instead of considering a 6 DoF spatial interface, some examples provide techniques to mitigate interaction fatigue by augmenting a 3 DoF orientation control with multi-touch deformation. Some examples contain novel interactions for 3D shape composition, i.e. activities that involve shape creation tasks (e.g. cross-section sweeping) and modification tasks (bending, twisting) in addition to manipulation.

Interactive design and shape modeling has also been studied with mobile interfaces. Several works have explored using multi-touch gestures on mobile devices to drive 3D modeling interactions. Multi-touch gestures contact multiple fingers simultaneously with a touch screen. In a multi-touch drag gesture, for example, multiple fingers are moved across the surface of a touch screen. Others have also proposed using such devices for multi-view 3D shape reconstruction. Xin et al. demonstrated the use of a tablet as an augmented reality (AR) canvas for 3D sketching, akin to creating wire-sculptures. Scheible and Ojala proposed "MobiSpray," a system for intuitive graffiti on large physical environments using mobile phones as spray-cans. Lakatos et al. and Leigh et al. proposed the use of mobile devices as spatially-aware hand-held controllers in conjunction with hand-worn gloves for 3D shape modeling and animation. Their work was more focused on demonstrating general interactions for modeling scenarios rather than exploring a concrete design work-flow for shape composition. Mine et al. described and discussed an immersive M-SUI system and demonstrated an immersive adaptation of the "SketchUp" application. Though their work provides an excellent set of guidelines for mobile-based modeling, their focus was towards an immersive system augmented with additional hardware for positional tracking. Some examples permit performing creative 3D composition through interaction and work-flow design. Some examples operate without the use of any additional hardware or vision based method for explicit position tracking.

Touch-enabled object rotation typically uses the trackball metaphor. Due to undesirable finger occlusions, multi-touch methods have been explored to facilitate dual-finger 3D interactions. Recent works have explored 6DoF control using single-handed, two-finger interactions. Decle and Hachet provide suggestive one-handed gestures to be applied outside 3D models boundaries for manipulation. To facilitate more precise inputs and constrained manipulations, 3D widgets have been explored to augment multi-touch gestures. The fundamental and implicit assumption in touch-based rotation (and rigid manipulation in general) is that the user would orient a 3D object to match the physical orientation of the interactive medium—the touch-surface in this case. This assumption is not applicable for tasks such as object deformation where "manipulation" is constrained on the surface of a 3D object rather than the whole object itself. Further, since a 3D object may include or consist of arbitrary geometric features with different surface normals at different locations, the physical "flatness" of touch-screens becomes an inherent limitation for deformation, which can be an orientation sensitive operation. This shortcoming makes it beneficial for users to rotate the object so as to match the general orientation of an ROI with the orientation of the touch-screen itself. To overcome this limitation, some examples provide a constrained (3DoF) mid-air method that allows users to perform 3D actions in the orientation in which the deformation is intended.

Most of the literature on deformation-based shape editing comes within the purview of computer graphics and makes use of standard interaction techniques either with a mouse or touch-enabled devices. Thus, mainstream clay modeling software is still predominantly based on WIMP interfaces in that they employ a brush-based interaction metaphor. Here, a user typically applies deformation to a shape using a single pointer as if painting on the surface of a 3D model with a brush. Additionally, the user also specifies the type and amount of deformation through traditional graphical user interface elements such as menus and sliders. This is true even for multi-touch interfaces where there is a potential for using additional finger input for creating richer and more intuitive interactions. Works by Bærentzen et al. and Paczkowski et al. have explored two finger interactions for deforming 3D shapes on tablets. However, the use of multiple fingers for deformation has not been studied or evaluated in literature in comparison to the conventional one finger approach. Some examples evaluate how a simple difference of using one and two fingers affects the users' performance and perception in a shape deformation activity. Informed by this evaluation, some examples define multi-touch interactions for shape deformation using a smartphone.

Illustrative System

Figure 2:
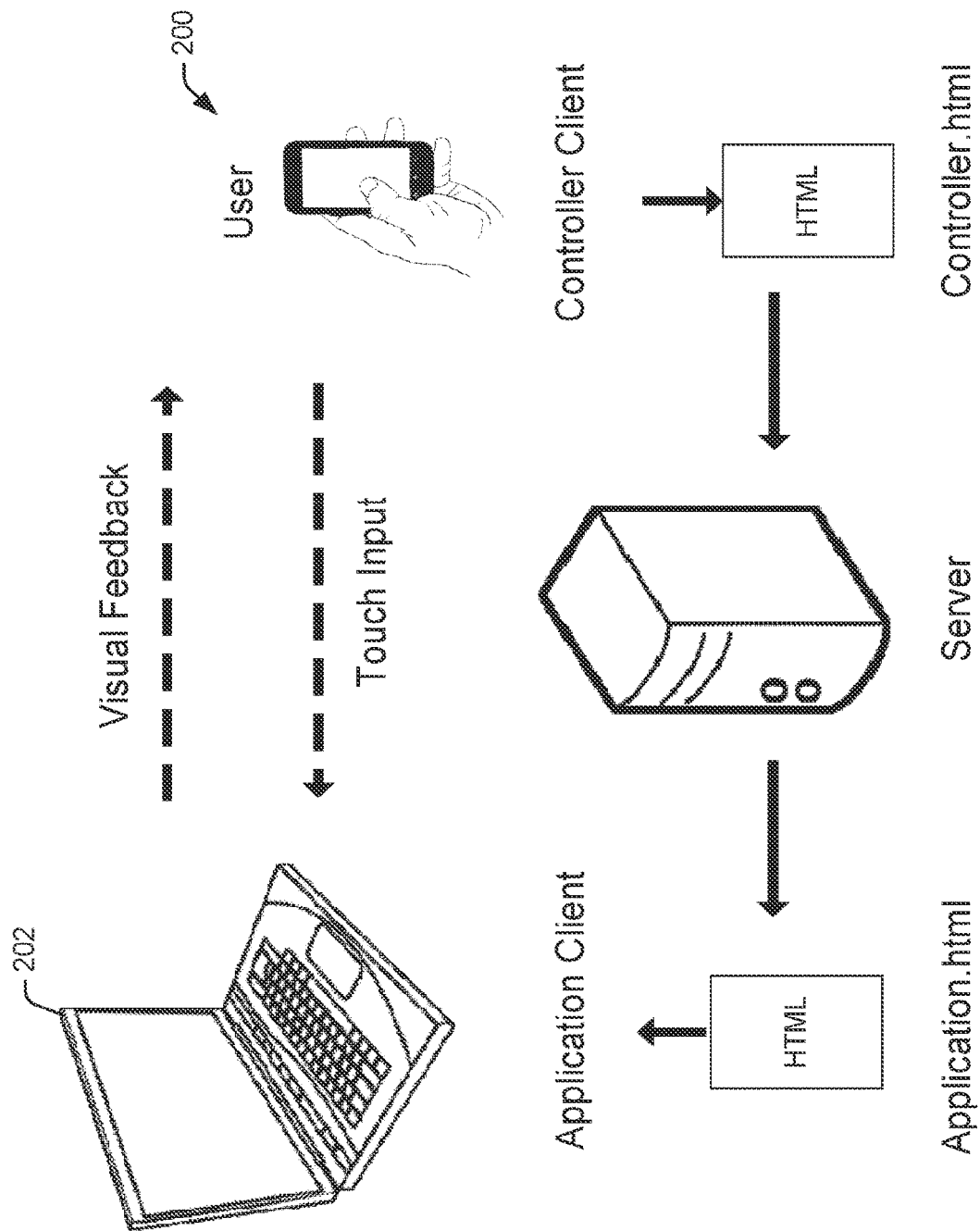
FIG. 2 illustrates a Web-based system architecture of some examples.
Figure 3:
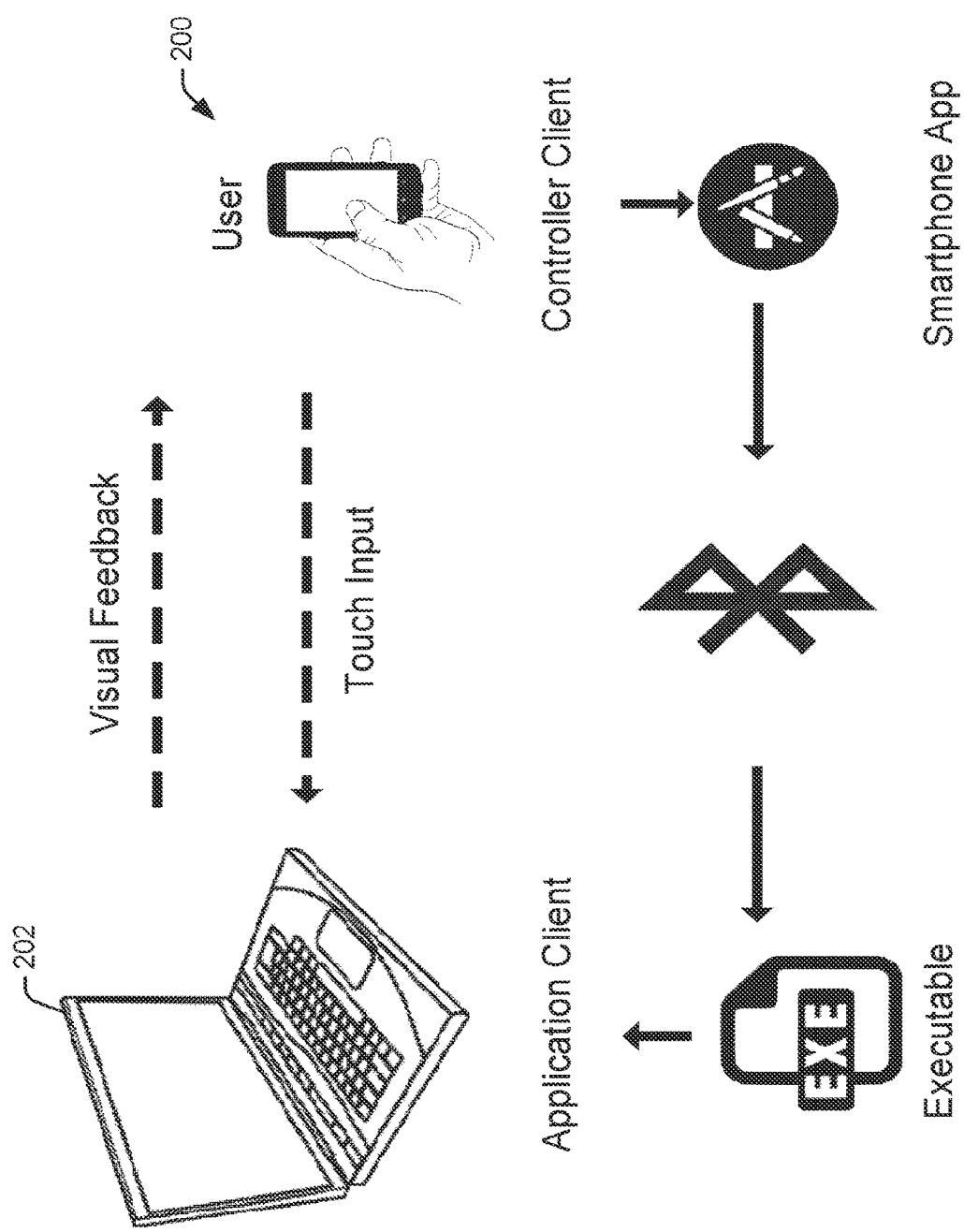
FIG. 3 shows a Bluetooth-based architecture for mobile device modification of 3D image.

FIG. 2 and FIG. 3 show components of an example system: human and environment data capture units, data processing units, and visualization/feedback units. Also shown are a user 200 and an environment. The user 200, in this case, can be a designer or a person intending to create and alter 3D shapes and the environment is the users' spatial surrounding comprising of certain key elements. In out scenario, these elements can be an empty design studio, or a table-top surface equipped with some visualization capability or a vertical wall setup with visualization capabilities. Also, any kind of touch-display capability is not necessary for this system to work, but may be seamlessly integrated while retaining the other aspects of this system. The human and environment data capture unit refers to a hardware device which is capable of providing data regarding the locations and motions of one or many users in the environment in a non-intrusive untethered manner, i.e. without the user wearing a device on his/her body for the purposes of capturing data. In context of this work, such a device could be a commodity depth camera such as MICROSOFT KINECT, ASUSFIXTION PRO or the ZCAM. The data processing units refer to one or many computing devices which can interpret the data acquired by the data capturing unit and convert those interpretations into meaningful actions in applications. This unit can comprise of the standard personal desktop computer, laptop computer 202 or a programmed embedded system comprising of microcontrollers like the ARDUINO. Finally, the visualization/feedback unit is responsible for providing a visual feedback of the shape modeling processes and operations being performed by the user 200. This unit may comprise of a standard visual display like a computer screen, a head-mounted display used in virtual reality (VR) systems or augmented reality displays. Visualization may also occur using a projector-wall or projector-table arrangements.

Mapping Mobile Device to Virtual Interaction Space

One elemental interaction in modeling is spanning the 3D space through translation and rotation. Some examples provide for interactions that can allow the user to specify the location and orientation of a 3D virtual object (effective as a local frame-of reference). The spatial spanning interactions combine interactions for direct and indirect manipulation as follows:

Orientation: Here, the phones gyroscope readings (roll, pitch, and yaw) are directly mapped to the orientation of a 3D object. In one implementation, quaternions transfer the device orientation to the virtual object. In order to provide a consistent mapping between the user's screen and the mobile device, there may also be a calibration step such that the user can specify the initial alignment of the device with respect to the screen Translation: This utilizes the multi-touch capabilities of the phone in order to provide translation inputs. The choice of combining touch input with direct orientation gives two distinct interaction metaphors: (a) Floating Canvas and (b) Laser Pointer.

Figure 4:
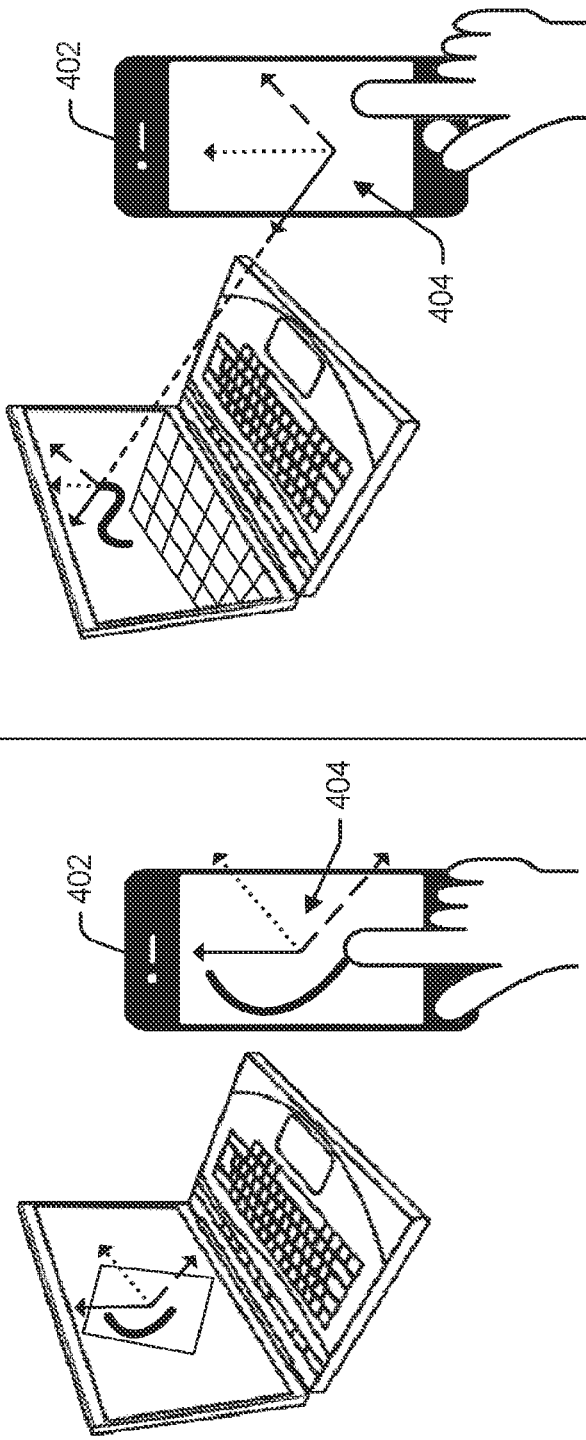
FIG. 4 is an illustration of the floating canvas and laser pointer mappings.

FIGS. 3 and 4 show several examples. The conceptual model of the Floating Canvas 400 is a plane moving in 3D space with a local coordinate frame attached to its center. The orientation of this coordinate frame is directly mapped from that of the mobile device 402. Given a 3D orientation, the user can translate this plane along the three axes 404 of the local coordinate frame by using two-finger gestures. Using a two-finger sliding or panning gesture, the user can translate the canvas along direction of sliding on the device 402. This is similar to panning on the plane of the canvas. Similarly, the user can translate the canvas along the normal of the plane by using the pinch gesture. This relates to the idea of offsetting the plane along its normal direction. Further, the decision regarding the sign of the offset (i.e. whether the value of the offset is positive or negative) is made on the basis of the direction of pinch. If the pinching happens so that the fingers come closer, the offset is positive and negative otherwise.

The physical laser pointer inspires the Laser Pointer metaphor 406 where the end of the pointer spans 3D space in the spherical coordinate system. Here, the coordinate frame is global, i.e., the origin of the pointer is fixed at a specified location in the virtual space and the user can vary the length of the pointing ray using two-finger gestures (FIG. 4). These two metaphors for spatial spanning form the basis of the framework of some examples.

3D Selection

Figure 5:
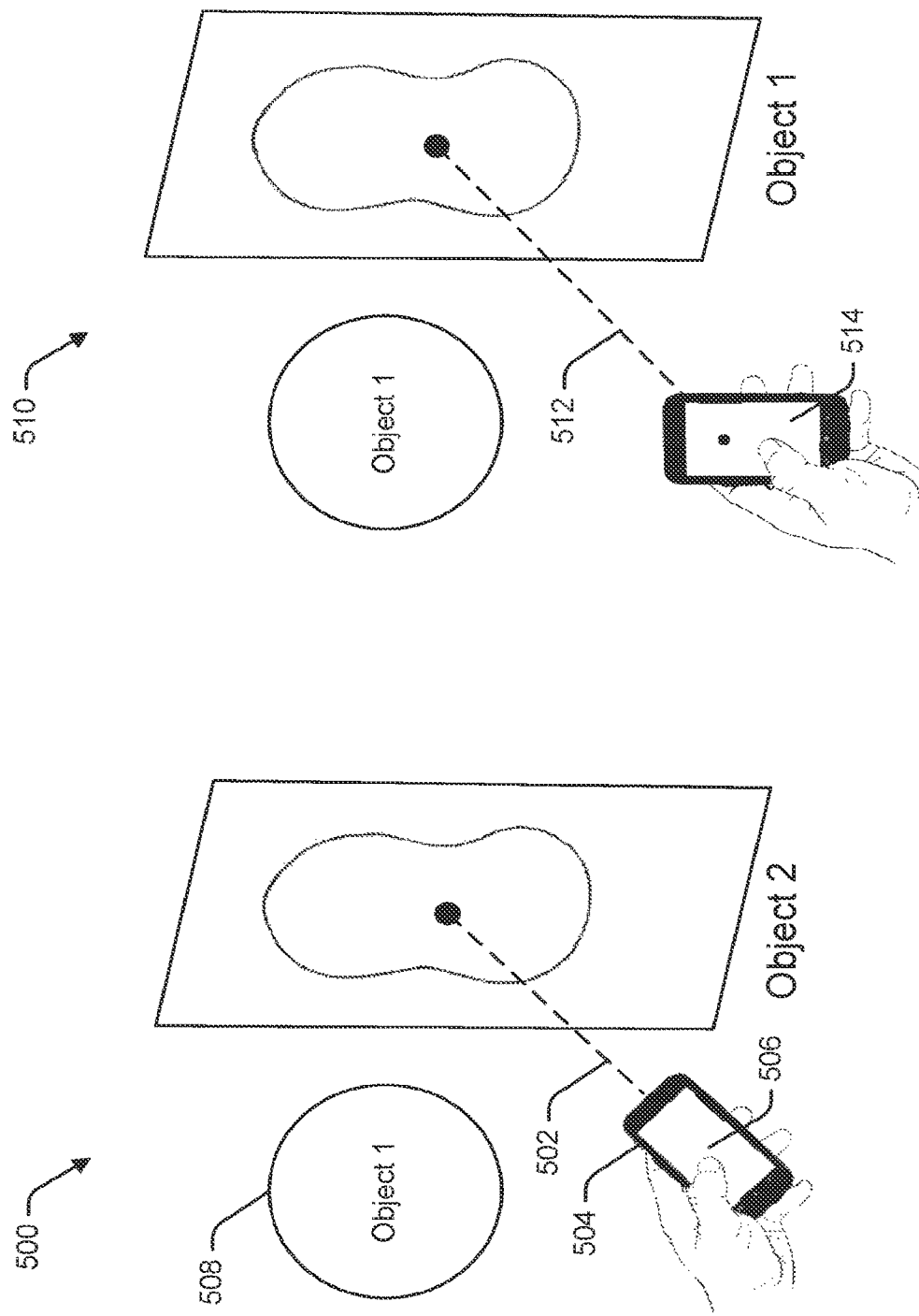
FIG. 5 illustrates 3D selection and view manipulation using the Floating Canvas and Laser Pointer mappings.

FIG. 5 shows some examples of object selection. Given a 3D virtual space comprised of a collection of multiple 3D objects, the selection of a single desired object from this collection is a basic operation. The second basic operation that is necessary is the selection of a desired region on a given 3D object. The objects can be parametric (such as engineering parts within assemblies) or free-form (such as the objects used in virtual clay modeling). Such a selection can be implemented using the Laser Pointer and Floating Canvas metaphors. Additional interaction techniques allow adaptive and context-aware view manipulation to increase the efficiency of selection.

Selecting whole objects: The most common technique to select objects in a virtual scene is the ray-casting method. Some examples permit mapping the definition of the ray in terms of the smartphone screen. For selecting a desired 3D object within a virtual scene comprised of multiple objects, a user can effectively use the laser pointer and floating canvas metaphors as shown in FIG. 5. In the case of the laser pointer 500, the selection is implemented by defining a virtual ray 502 from the smartphone 504 contained within the plane of the phone's screen 506. Rotating the phone 504 simply rotates the ray 502 in the virtual scene and the ray's intersection with a given object 508 results in the selection of that object 508. Similarly, in case of the floating canvas 510, the ray 512 is defined along the normal of the phone's screen 514 as shown in FIG. 5.

Figure 6:
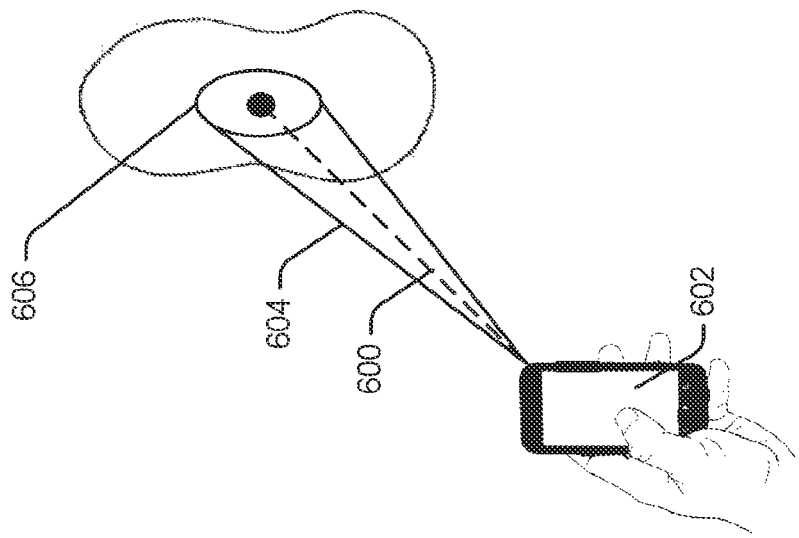
FIG. 6 illustrates region selection using the Floating Canvas and Laser Pointer mappings.
Figure 6:
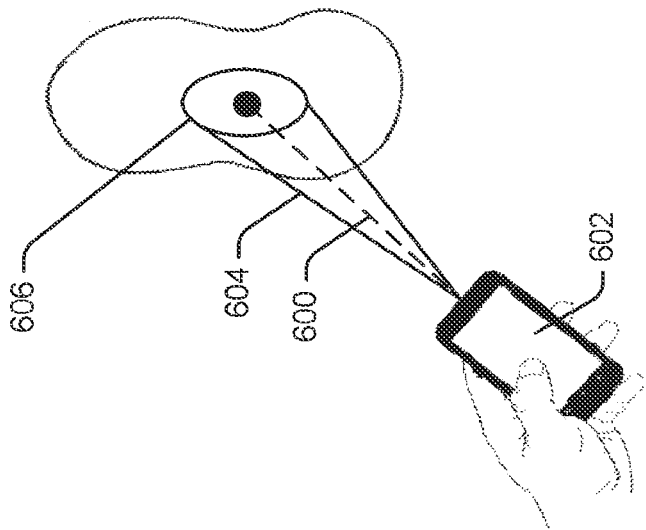

Selecting regions on objects: In case where the user wishes to select a specific region on the surface of a 3D object, some examples use cone-casting. This technique has been traditionally used to refine a user's selection of whole objects in a cluttered 3D virtual environment. Some examples permit selecting regions on a single given object in a scene using this technique. As shown in FIG. 6, the ray 600 defined with respect to the smartphone's screen 602 is replaced with a right-circular cone 604 around the ray 600. The intersection of this cone 604 with the surface of a 3D object can define a region of interest 606 on the object. The shape of the cone 604 can be modified either by the user or through a menu selection to modify the shape of the intersecting region.

Figure 7:
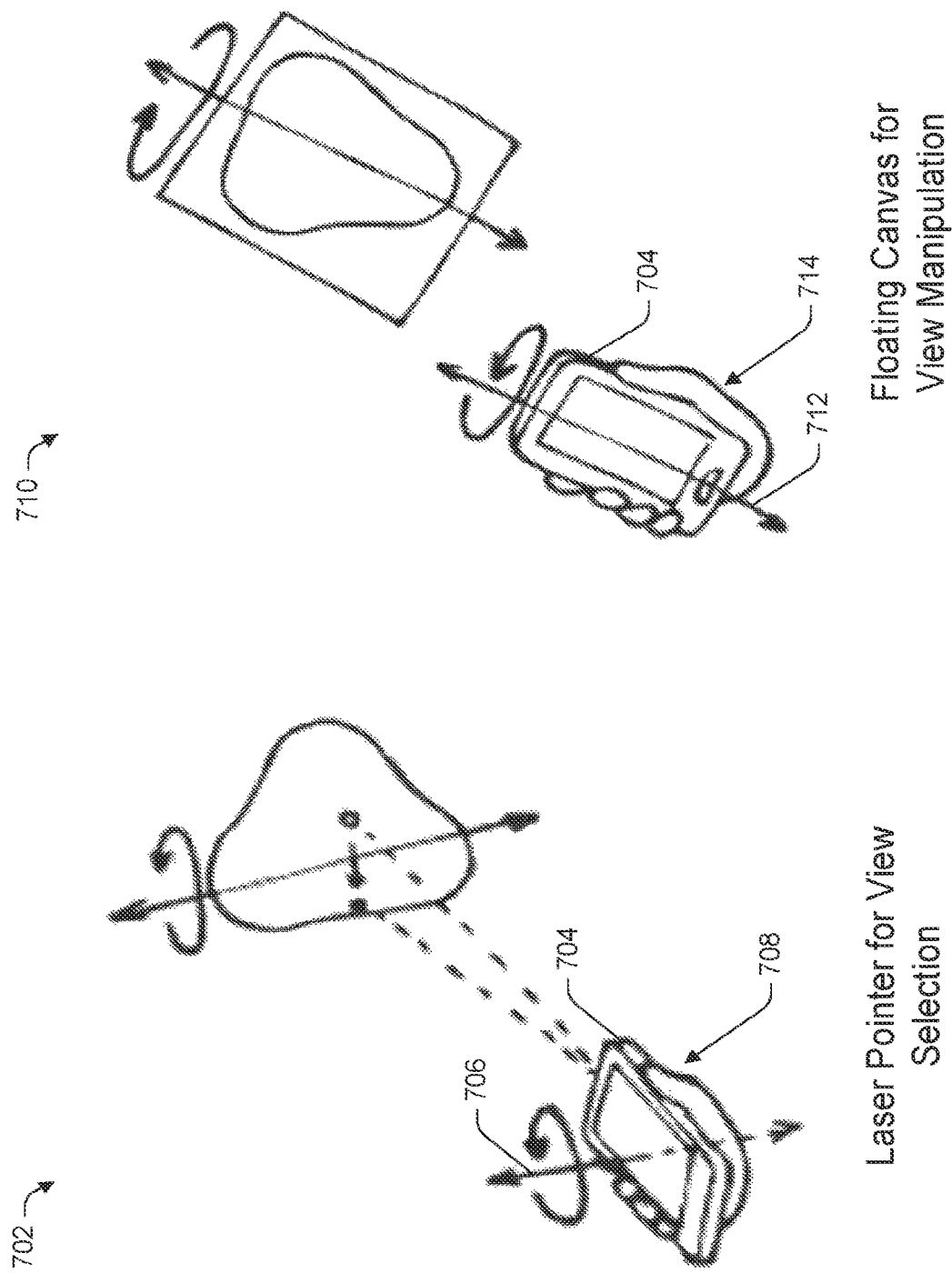
FIG. 7 illustrates view manipulation using the Floating Canvas and Laser Pointer mappings.

Manipulating Scene View: The common workflows in existing CAD and modeling software programs typically separate the actual shape creation/modification task from the object view manipulation. Automatic view control has been proposed recently for drawing on 3D surfaces and for a pottery interface for context-aware shape rotation. The interaction metaphors of some examples permit users to perform automatic view manipulation and object rotation. This can be achieved in two steps. The first step involves the detection of events that specify when the user wishes to start and stop camera or object rotation. This can simply be achieved by providing the user with a button on the smartphone screen that, when pressed, will signal the software system to begin the process of changing the scene view or alternately rotate a 3D model in the scene. Once the user's intention to rotate has been established, the second step is to implement the mechanism for controlling the rotation of the camera (or alternately the object). FIG. 7 illustrates how such a rotation is implemented. In case of the laser pointer 702, the user points at an object in the scene and rotates the smartphone 704 about the axis 706 defined by the normal direction of the phone's screen 708. In the second case of the floating canvas 710, the rotation occurs about an axis of rotation 712 that lies on the plane of the smartphone's screen 714.

Creation of Curves

By using the Floating Canvas metaphor, a variety of geometric objects can be created by a user. The most fundamental of these objects are curves in 3D space. There are different interactions for creating two different kinds of curves: planar (curves that lie on a plane defined in 3D space) and spatial (i.e. the curves that do not necessarily lie on a plane in 3D space). Unlike traditional techniques in CAD, the content of some examples provide a more direct approach for specifying curve parameters. It also provides advantages over existing 6 DOF interactions in terms of controllability and accessibility. To transform raw curve input data into precise parametric form, some examples use sketch beautification methods and constraint solving methods.

Figure 8:
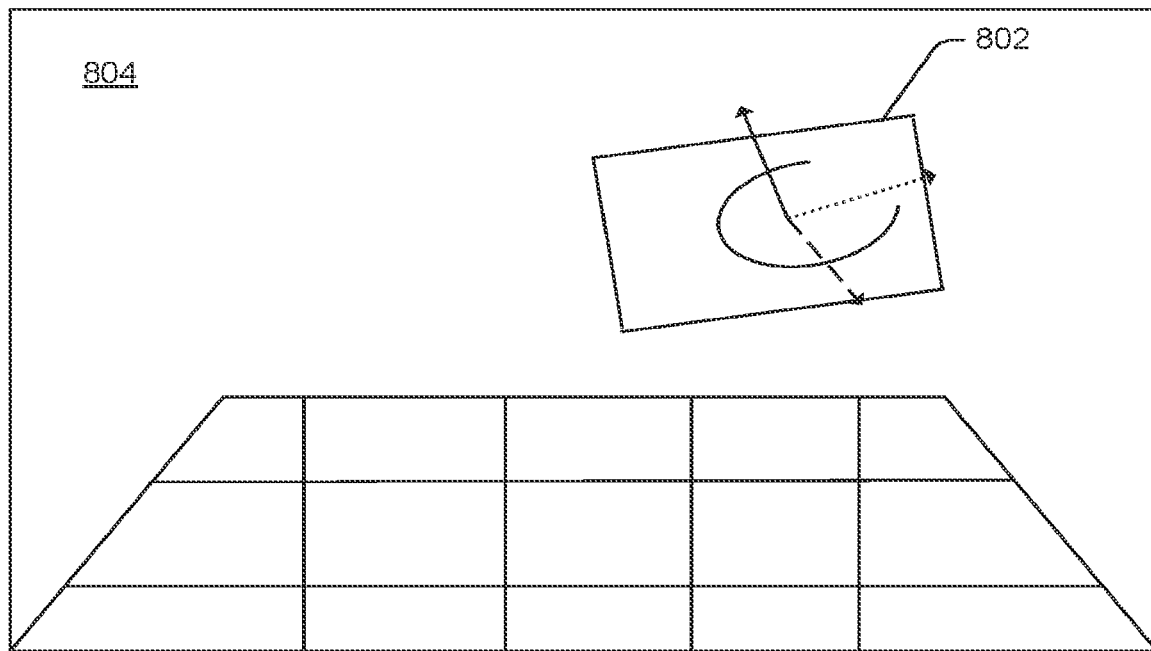
FIG. 8 illustrates the Floating Canvas interaction for the creation of planar curves in 3D space.
Figure 8:
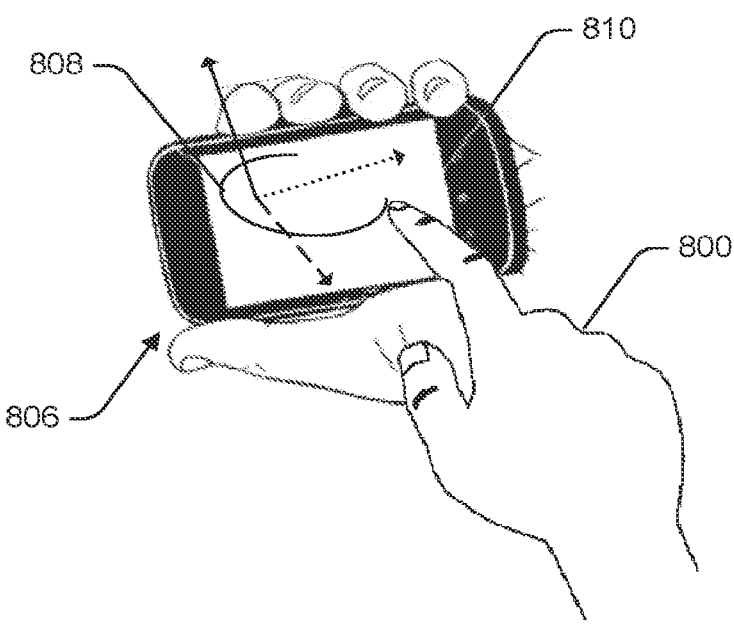

2D Curves in 3D Space: In order to draw planar curves, the Floating Canvas metaphor can be used with one-point touch gestures to directly define the curve plane and geometry. In FIG. 8, the user 800 simply places the Floating Canvas 802 at a desired location in virtual space 804 and orients the canvas by using the hand-held smartphone 806. As described previously, the orientation of the smartphone 806 directly defines the orientation of the plane on which the curve 808 is being drawn. Once the user 800 has defined the location and orientation of this plane, the user 800 simply can draw a curve 808 on the smartphone screen 810 which is then directly visualized in the virtual space 804.

Figure 9:
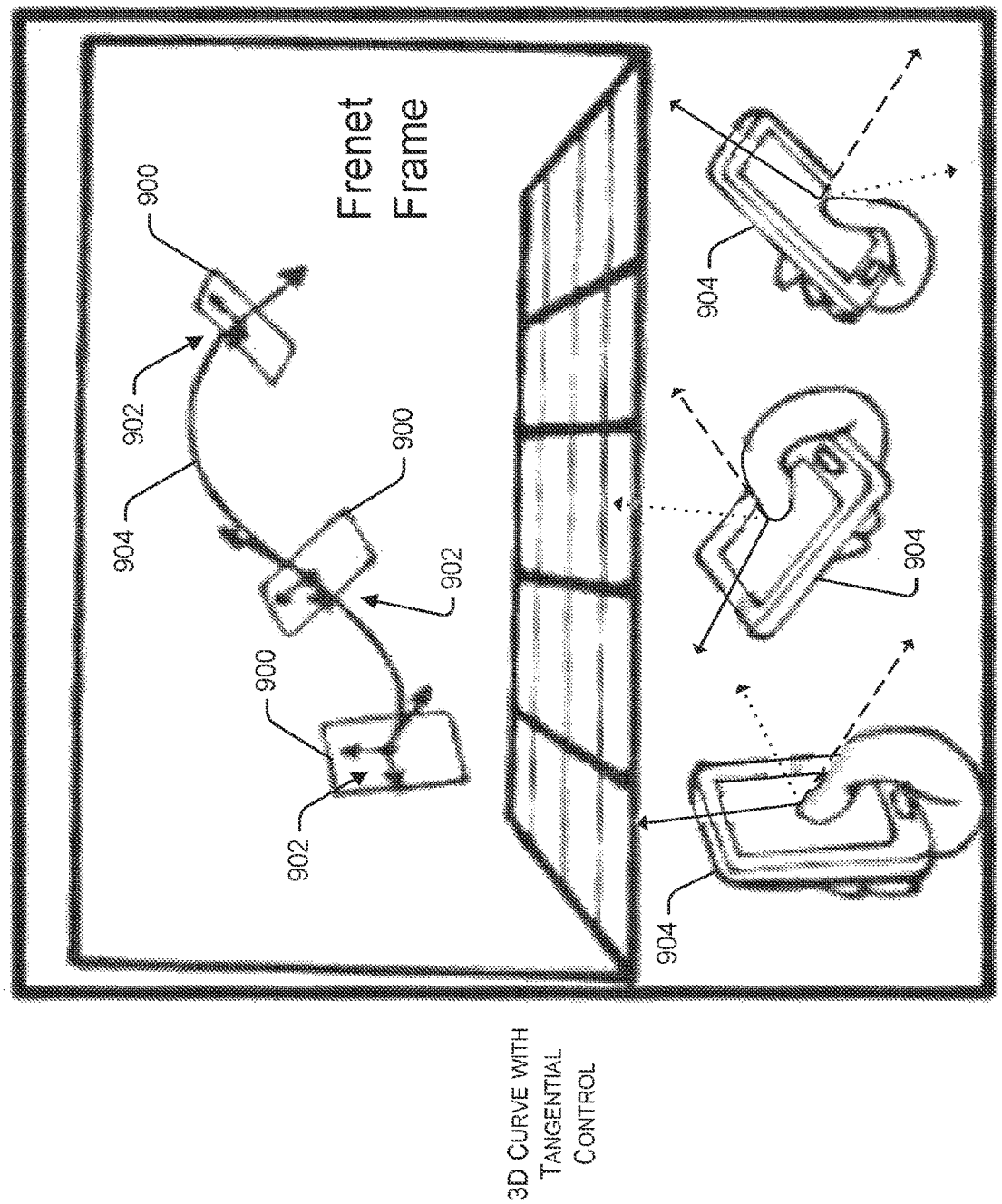
FIG. 9 illustrates the Floating Canvas interaction for the creation of fully 3D curves in 3D space.

3D Curves in 3D Space: As shown in FIG. 9, in order to fully create three-dimensional curves (i.e. curves that have both bending and twisting properties), the Floating Canvas can be used to sequentially arrange datum planes, such that their central positions and normal directions define local 3D curve parameters. Note that the canvas plane 900 has a coordinate frame 902 whose orientation is directly controlled by the rotation of the smartphone 904. This coordinate frame 902 will serve as the Frenet frame for each point on the 3D curve 906. Here, the user first specifies the intent to create a 3D curve 906 using a menu on the smartphone 904 and then use the offsetting operation by pressing and holding on the screen of the smartphone 904 while simultaneously rotating the phone 904 (FIG. 9). This simultaneous use of the gesture (press and hold) with phone 904 orientation can permit the user to "sweep" the virtual canvas and consequently create a curve through a sequence of the Frenet frames of the curve.

MobiCAD: Design of Parametric Shapes

Datum planes are fundamental entities in engineering design. They provide spatial references for configuring protrusion profiles and trajectories. Within conventional CAD systems, this is a tedious process, involving a number of operations and manual parametric configuration of each plane. Using the Floating Canvas metaphor, we demonstrated how the whole process of engineering design can be transformed to enable embodied interactions. One aspect of the metaphors is that the user can directly specify datum planes through tilt-touch combinations on the mobile device.

Figure 10:
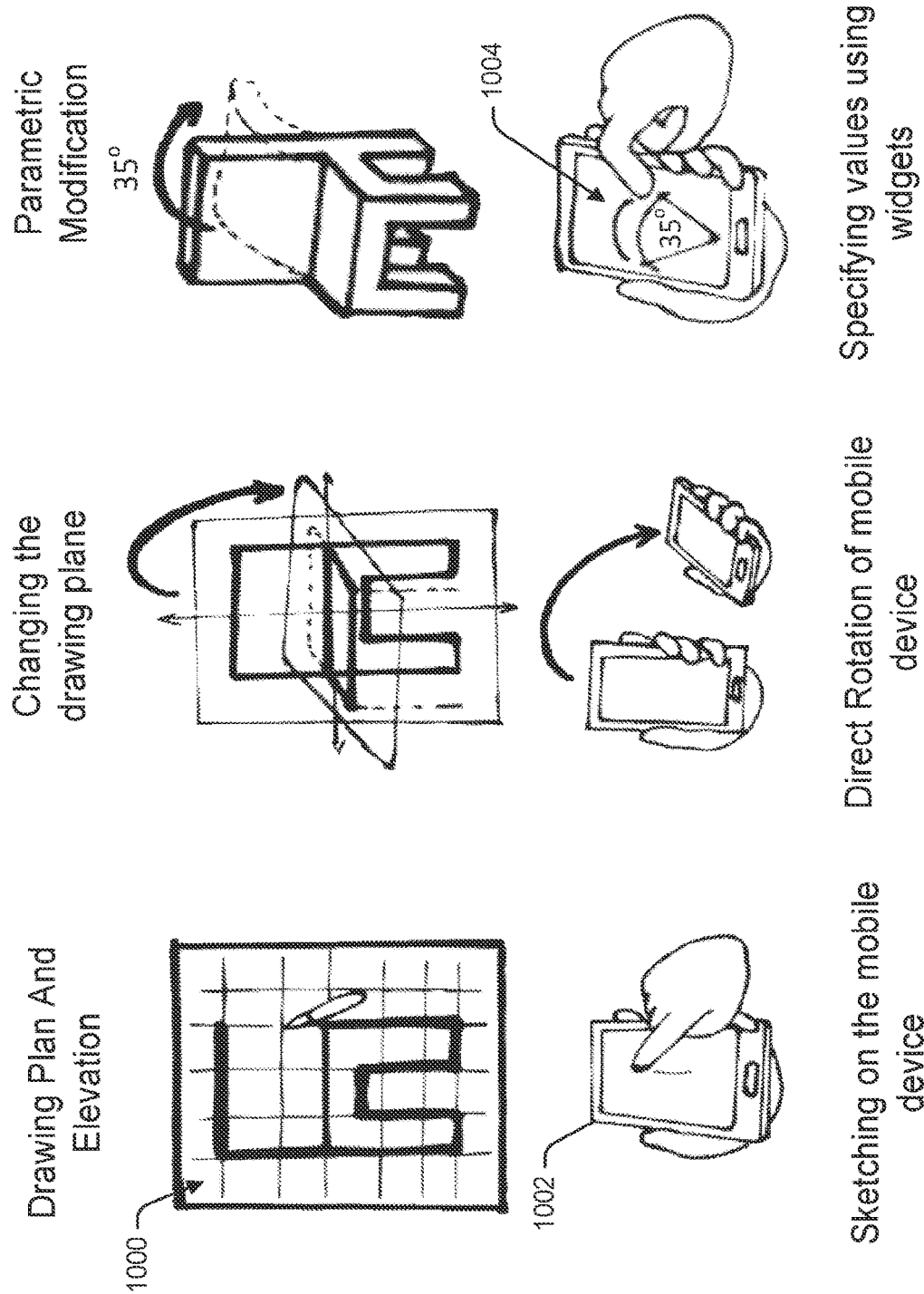
FIG. 10 illustrates creation and modification of parametric shapes.

Protrusions: In contrast to CAD, various examples herein provide a collocated modeling space for constructing both the curves and the protrusion. This allows users to interactively explore different protruded shapes without switching modes. For example, users can create linear extrusions using pinch/swipe gestures, uniform and variable section sweeps, and revolved extrusions (FIG. 10). Using this scheme, multiple adjoining protrusions can be easily composed for creating more complex 3D models. The protrusions can also be made subtractive to remove material from existing shapes.

Feature Selection: 3D engineering models are defined by geometric (e.g. surface, edge etc.) and modeling (e.g. protrusion, fillet, chamfer etc.) features, whose form can be modified through direct manipulation of feature dimensions. By using mobile-based region selection metaphors, users can select distinct features and dimensions for modification.

Detailing Operations: By combining the interactions for region selection, menu navigation, and interactive dimensioning, users can also create fine level features such as fillets, rounds, chamfers, and holes on top of protrusions.

Dimensional Modification: This interface combines expressive touch and motion-based gestures on a mobile device for dimensional modification. Touch-based gestures can include two-finger pinch or twist to control linear and angular dimensions. Motion-based gestures on the other hand involve suggestive motion of the mobile device itself. For example, a turning motion of the device can be used to define angular dimensions (FIG. 10). This system also enables keypad-based alphanumerical inputs on the GUI display of the device for precise dimensional control.

Mating Relations: Due to parametric interdependencies within 3D engineering models, modification of one model feature inherently necessitates adjustment of others. This is analogous to "brushing and linking" in information visualization, where a changes in one form of data representation gets automatically reflected in others. In some examples, there are provided mobile interaction metaphors for representing, visualizing, and controlling parametric relations in 3D models by invoking region selection metaphors, touch-based interactions, and menu navigation.

Assembly: There are also methods for mobile-based interactions to support simple and intuitive 3D assembly. In existing CAD applications, the assembly workflow is very tedious as it requires users to explicitly define geometric and spatial constraints between interconnected components. We have developed a more direct approach that uses our mobile-based manipulation metaphors to enable rapid configuration of assembly components. In FIG. 10, a user may sketch a drawing 1000 on device 1002. Users only need to approximately define the configurations, through, for instance, rotating device 1002. Using 3D constraint recognition (Siemens 3D DCM, DS Spatial CDS), our modeling systems automatically infer and apply appropriate relations between components based on proximal, spatial, and semantic similarities (e.g. surface mates, full or partial insertions, parallelism, perpendicularity, concentricity, tangents etc.). Additionally, by using this dimensioning scheme, users can define numerical relations 1004 like linear/angular offsets. In contrast to existing mid-air interactions where users need to switch between modalities to provide precise inputs, our method allows for both spatial control and precise inputs using the same device.

MobiSweep: Sweep-Based 3D Shape Compositions

Sweep surface representations are fundamental in computer-aided geometric design (CAGD) and provide a simple and powerful means for defining 3D shapes of arbitrary complexity. Further, sweep surfaces inherently lend themselves to an intuitive association to the process of sweeping a 2D shape in 3D space. In this context, we inspire our work with two observations from CAGD and M-SUI. First, traditional construction of sweeps relies heavily on the procedural specification of datum planes as spatial references and 2D curves profiles and trajectories. Within conventional CAGD systems, this is a tedious process, involves a number of operations, and requires parametric configuration of each plane. Secondly, even though sketch-based interactions are common to both geometric modeling and 2D mobile applications, their utilization in existing M-SUI's has been severely limited towards mid-air shape creation.

Figure 11:
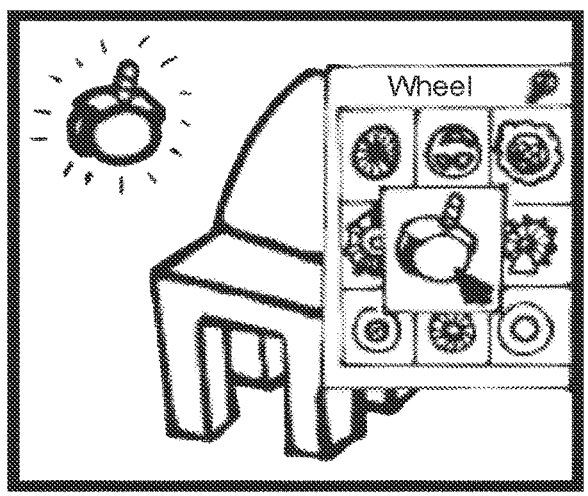
FIG. 11 illustrates search and assembly of parametric shapes.
Figure 11:
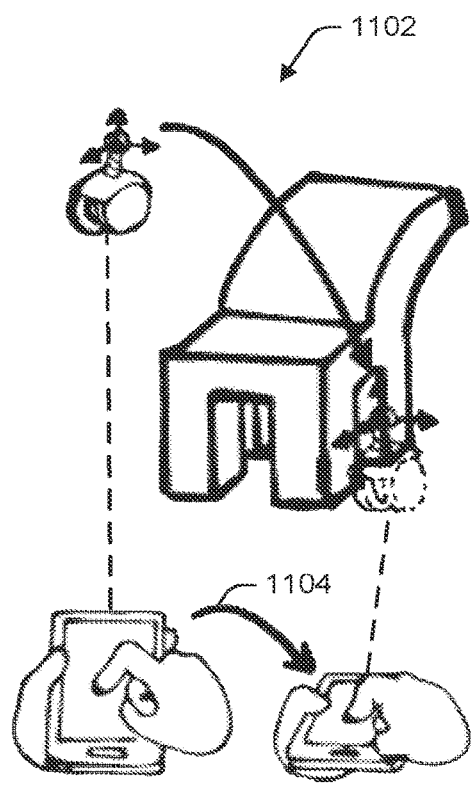
Figure 11:
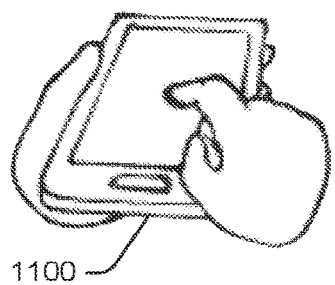

In some examples, by combining the spatial freedom in mid-air interactions with multi-touch capabilities of smartphones, workflows can be constructed to enable expressive design exploration. To this end, as shown in FIG. 11, we introduce an interaction metaphor that uses a smartphone 1100 as a hand-held canvas. Our interaction is an extension of the free plane casting method proposed by Katzakis et al. By adapting the canvas metaphor for sweep surface creation, we demonstrate how users can directly create, modify, and compose 3D design concepts 1102 through tilt and touch interactions 1104 on the mobile phone 1100. The broader goals of our work are to (a) identify methods to combine tilt and touch interactions for 3D shape conceptualization and (b) explore new metaphors to associate 3D modeling operations to mobile interactions.

The design goal behind MobiSweep is to strike a balance between modeling constraints, interaction techniques, and system workflow to enable direct spatial ideation. There are mainly two fundamental aspects that we considered while designing MobiSweep: (a) 3D manipulation and (b) sweep surface generation. For 3D manipulation, the critical aspect under consideration is to minimize fatigue for precise manipulations and minimize the interaction time for coarse manipulations. Instead of imposing full mid-air movements, we employ touch gestures to allow controlled and precise 3D manipulation of virtual objects. In order to minimize learning time, we take advantage of the fact that most users are already familiar with multi-touch gestures for manipulating objects. Thus, we define a single context-aware interaction metaphor that: (a) uses multi-touch gestures and (b) is shared between several modeling tasks.

Figure 12:
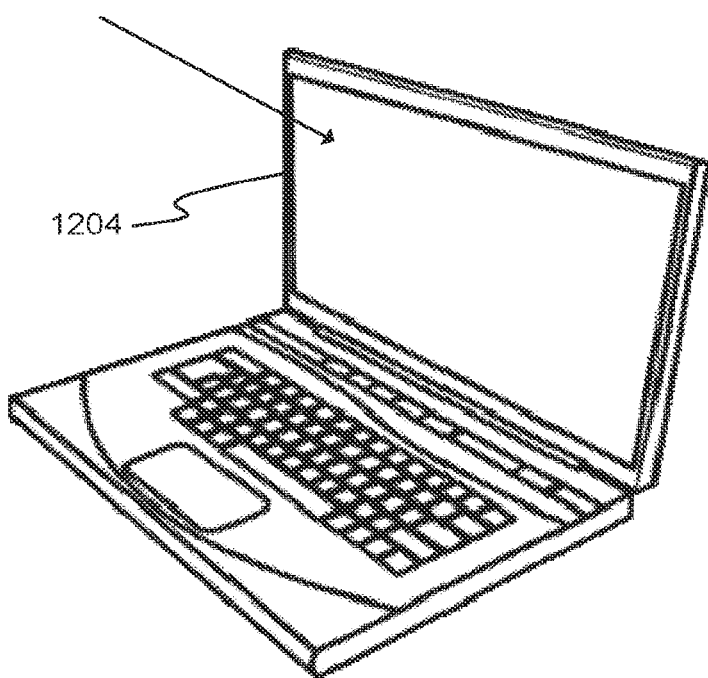
FIG. 12 illustrates a visual display of the virtual environment and a smartphone that acts as a reference plane in the virtual environment.
Figure 12:
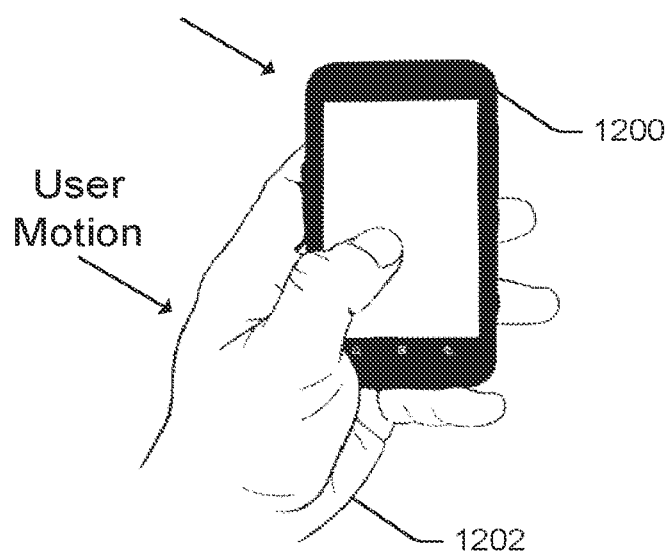

In some examples, the separation of degrees-of-freedom (DoF) can be effective if the interactions for the task (sweeping a section) are synergistic with the input mode provided by the device (the smartphone). Based on this, we inspire our approach from the free plane casting method by combining direct orientation control with indirect gesture based position control. For instance, in FIG. 12, we introduce an interaction metaphor—phone as a reference plane 1200—that emulates the action of sweeping a sketched cross-section that is held in the user's hand 1202. In doing so, we do away with the procedural specification of planes as spatial references for drawing 2D curves to define profiles and trajectories, as is predominantly done in conventional CAD systems. The virtual environment can be depicted on a screen of computing device 1204. One advantage of our metaphor, in some examples, is that in addition to creation, it naturally lends to spatial actions such as on-the-fly bending, gesture-based cross-sectional scaling, and in-situ modification of the cross-sectional shape by sketching.

Mobile Device Calibration

Figure 13:
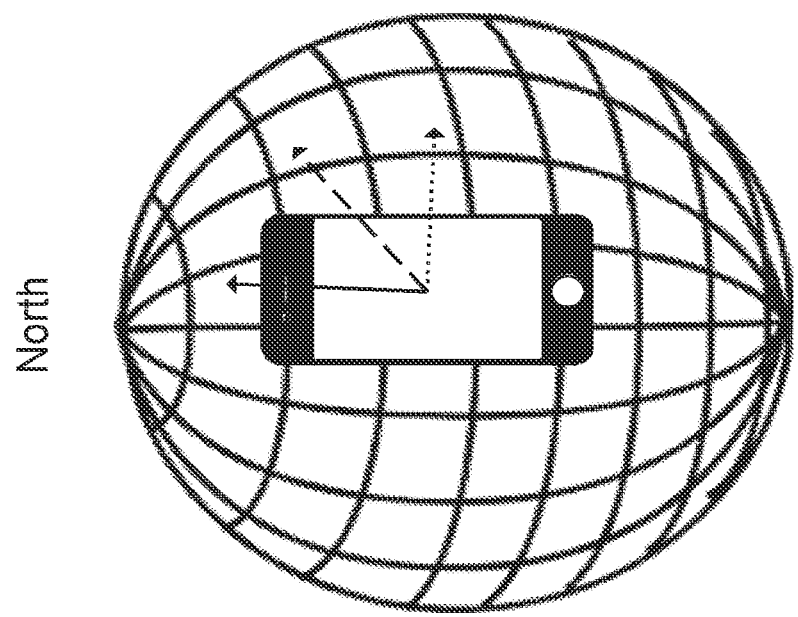
FIG. 13 illustrates a smartphone coordinate system and orientation convention (left) and its relation to the global reference direction given by the magnetic north (right).
Figure 13:
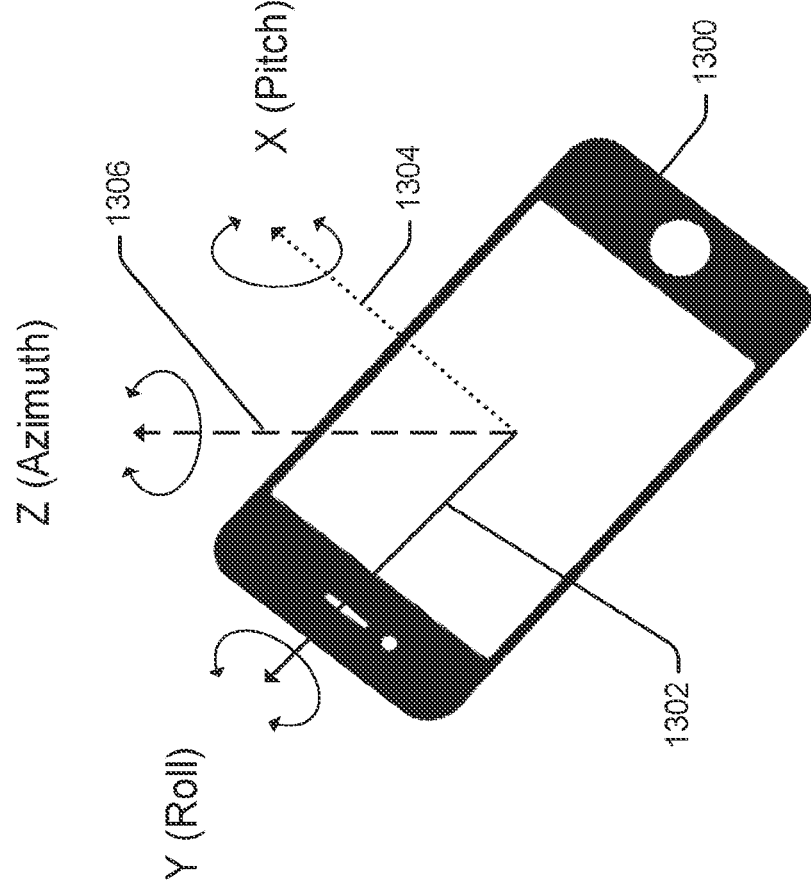

Systems and software on a mobile phone 1300, such as Android SDK, provides the phone orientation in the form of roll 1302, pitch 1304, and azimuth 1306 (FIG. 13). Because the azimuth 1306 of the mobile phone 1300 points to the magnetic north, its value is location dependent. Thus, in some examples, the rotation of the phone 1300 with respect to its z-axis (i.e. plane normal) can be initialized to match with that of the reference plane.

Figure 14:
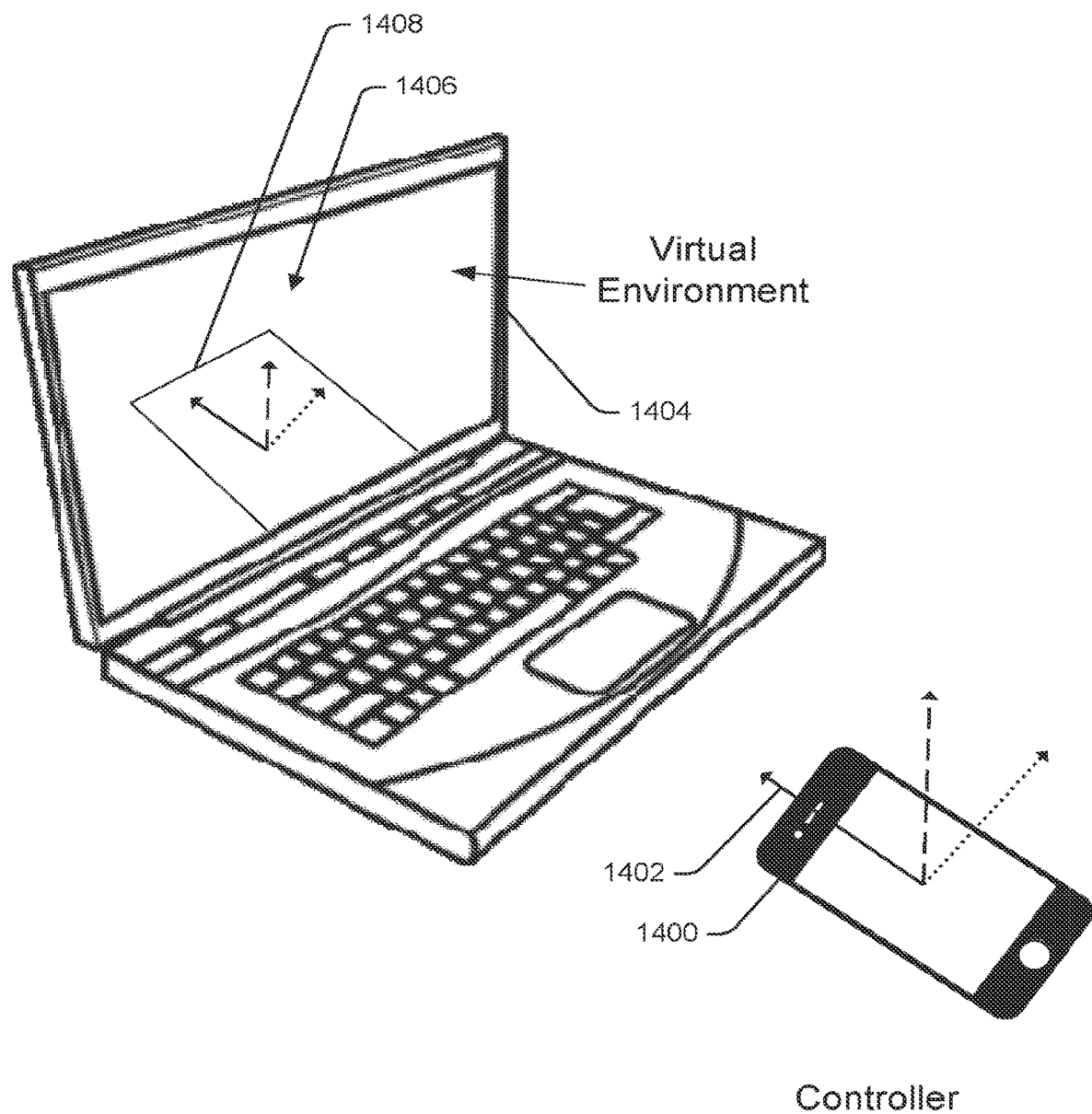
FIG. 14 illustrates initial alignment of mobile device to the screen during calibration.

To do this, as shown in FIG. 14, we first conduct a calibration step where the phone (controller) 1400 is held horizontally with its local y-axis 1402 directly pointing at the computer screen 1404. In the virtual environment 1406 this corresponds to the horizontal alignment of the reference plane 1408 with its center at the origin. We average the first 30 frames of the azimuth values to compute a datum value. This datum values is subtracted from all subsequent azimuth readings during subsequent interactions.

In order to define the interaction work-flow for MobiSweep, we begin with the definition of our interaction metaphor—phone as a reference plane. Given a hand-held phone, we can define a reference plane in the virtual 3D space with a local coordinate frame. Subsequently, the objective is to allow the user to specify the location and orientation of the reference plane. We define the following gestures to achieve this objective.

Figure 15:
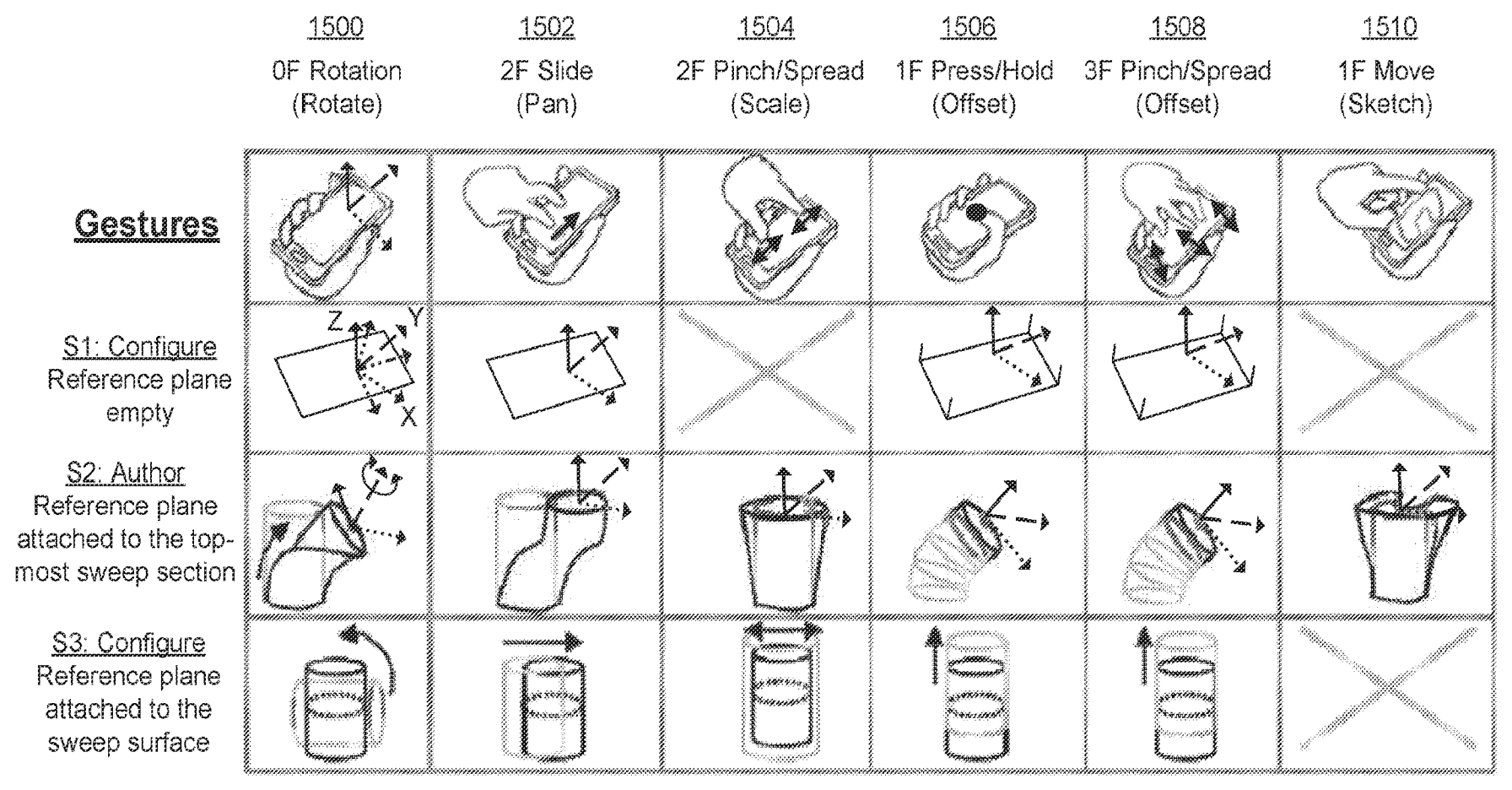

Rotate (Referencing 1500 in FIG. 15): Here, the orientation (and hence the local coordinate frame) of the phone is directly mapped to that of the reference plane. Thus, simply rotating the phone results in the rotation of the reference plane (FIG. 15: column 1, row 2). In order to compute the amount of rotation, the azimuth-pitch-roll representation can be utilized. In some examples, we used the azimuth-pitch-roll representation to rotate the reference plane using the phone (FIG. 13). Let a, p and r be the azimuth, pitch, roll angles respectively. Following the calibration of the smartphone, we first compute the rotation matrix of the reference plane given by M=A*P*R. Here, A represents rotation about y-axis by angle a, P represents rotation about x-axis by angle-p, and R represents rotation about negative z-axis by angle r. Applying this matrix to the datum coordinate frame (FIG. 14) gives the rotated coordinate frame of the reference plane.

Pan (Referencing 1502 in FIG. 15): Using the two finger sliding gesture, users can translate the reference plane on the x-y plane of the local coordinate system (FIG. 15: column 2, row 2). In any orientation of the canvas, users can perform in-plane translation by using the two finger sliding gesture. The translation applied to the canvas is given by $s_p(m_t-m_{t-1})$ where $m_{t-1}$ and $m_t$ are the mid-points of the two fingers in the previous and current time frames. Here, $s_p$ is a predefined constant denoting the sensitivity of panning. This is similar to in-plane panning as in the case of the free plane casting interaction.

Scale (Referencing 1504 in FIG. 15): Users can also perform in-plane scaling by using a two finger pinch gesture. However, scaling is a context dependent operation that is allowed only when the reference plane either contains a sweep section (FIG. 15: column 3, row 3) or is attached to a 3D object during a manipulation task (FIG. 15: column 3, row 4). The scaling factor applied to the reference plane is given by $d_t-d_{t-1}$ where $d_{t-1}$ and $d_t$ are the distances between the two fingers in the previous and current time frames respectively.

Offset (Referencing 1506 and 1508 in FIG. 15): In order to allow the user to translate the canvas along it's normal, there are two gestures, namely one-finger press (FIG. 15: column 4, row 2) and hold and three-finger pinch (FIG. 15: column 5, row 2). When a user applies the one-finger press gesture, the canvas automatically starts moving along its normal with a predefined speed. Users can also offset the canvas by applying a three-finger pinch-spread gesture. In this case, the magnitude of offset is defined by $s_o(1.0-A_{t-1}/A_t)$, where $s_o$ is a predefined constant denoting the offset sensitivity and $A_{t-1}$ and $A_t$ are the magnitudes of the areas of the triangle formed by the three fingers of the user. The one finger method provides a quick and relatively less precise method for offsetting. On the other hand, the three finger gesture requires more effort but allows for a more precise and bi-directional control of the canvas.

Sketch (Referencing 1510 in FIG. 15): Given a 3D orientation, users can sketch a curve on the canvas using the traditional one finger movement. Similar to scaling, we allow sketching selectively based on the modeling task the user is performing (for instance when the user wants to re-define the cross-section of a sweep surface).

Modeling States

Figure 16:
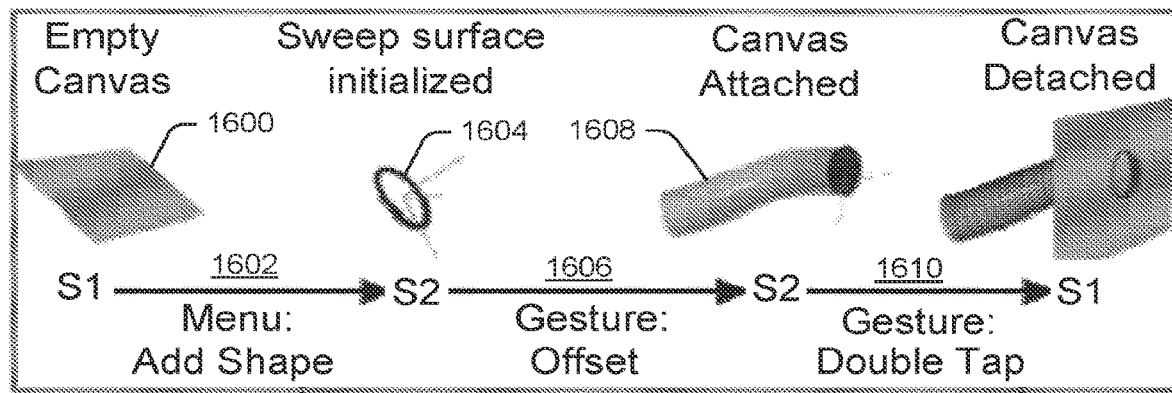
FIG. 16 illustrates a technique for shape creation (a), in which the user selects the Add Shape menu item and creates a sweep surface using one or three finger offsetting gesture. For manipulating a shape (b), the user first hovers on a desired sweep surface and selects the shape using the double-tap gesture. In the shape modification example (c) the user modifies the initial section by sketching, creates a sweep surface, and modifies the final section by sketching, scaling, and panning.
Figure 16:
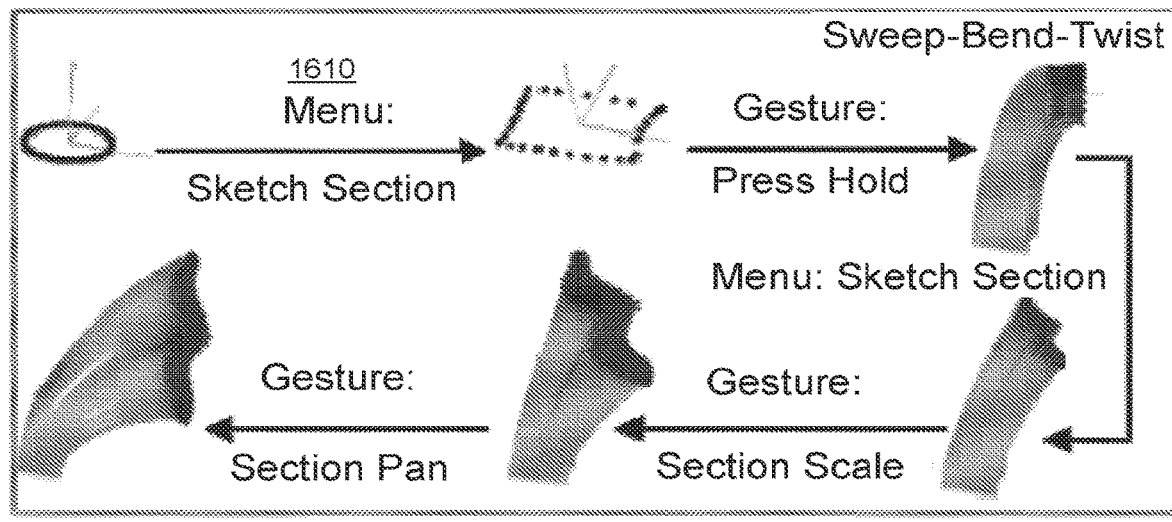
Figure 16:
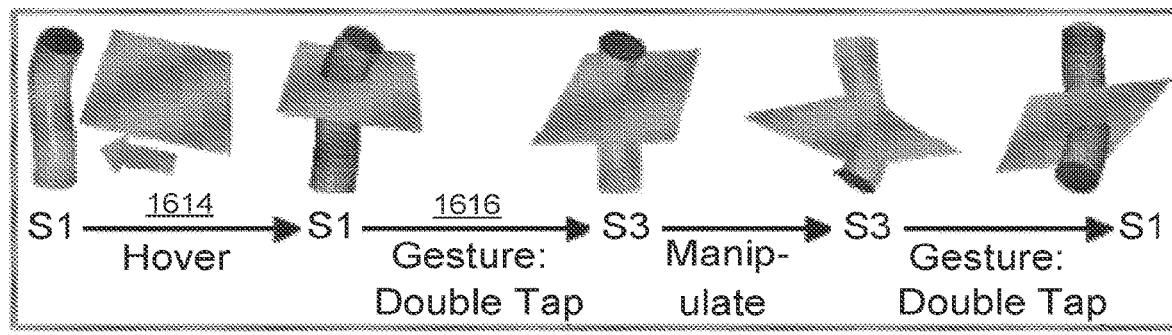

The gestures defined for manipulating the reference plane form the basis of the workflow of some examples. For any given state in the work-flow, the input gestures (FIG. 15: row 1) remain the same but the reference plane takes a different meaning according to the context of the states (FIG. 15: rows 2-4) as defined below:

Configure (S1): In this state, shown in FIG. 16, the reference plane 1600 is detached from all existing shapes (if any). This empty plane can be manipulated to a desired location and orientation in 3D space using the gestures described above (FIG. 15: row 1). Such as manipulation may occur either during the creation of the first shape of a composition or during in-situ composition where a user is directly creating one shape on an existing shape. Alternately, users can also move the reference plane 1600 in order to select an existing shape in the virtual environment.

Author (S2): In this state, the reference plane is attached to the top-most section of a sweep surface. Users can (a) create a swept surface by offsetting (FIG. 15: columns 4-5, row 3), (b) bend and twist a sweep surface by rotating the phone (FIG. 15: column 1, row 3), (c) pan and scale a section using two-finger gestures (FIG. 15: columns 2-3, row 3), (c) modify a section's shape by sketching on the phone (FIG. 15: column 6, row 3).

Manipulate (S3): This state involves rigid transformation of a swept surface for composing through assembly. Here, the reference plane serves as a container for the swept surface through which users can translate, rotate, or scale the surface. Additionally, users can also copy an existing shape and reuse a transformed version of the copy within the composition.

Modeling Work-Flow

In the work-flow of some examples, the configure state (S1) is the base state from where users can transition to either the authoring state (S2) or the manipulation state (S3). The transitions between these states are enabled using a combination of menu and gestures. The controller interface for MobiSweep is a single-screen Android application that allows for two distinct modes of interactions: (a) multi-touch input for reference plane manipulation, sketching, and state transition and (b) menu navigation for state transitions and general software tasks. Below, we describe the three canonical examples for creation, modification, and manipulation of swept shapes.

Shape Creation: The creation of a swept surface involves the transition from the configure (S1) to the author state (S2) (1602 FIG. 16(*a*)). For this, the user selects the "Add Shape" button on the menu, thus expressing the intent to begin the creation of a sweep surface. Once the user has expressed the intention to add a shape, the visual representation of the reference plane 1600 changes to a default circular section 1604. The user can now sweep the section by using the one finger press-hold (or three-finger pinch-spread) gestures. This corresponds to the offsetting operation 1606 occurring along the reference plane normal. By continuously re-orienting the phone during the sweeping process, users can create curved sweeps 1608. Users can also modify the swept surface as described in the following section. Once the user has created a desired shape, the swept surface can be detached from the reference plane using the double-tap gesture 1610 effectively bringing the user back to the configure state.

Shape Modification: Once the user has created a swept surface, the authoring state allows users to modify it as long as the user has not detached the reference plane from the surface. The reference plane is attached to the top-most section of the sweep surface (FIG. 15: column 3). Hence, all interactions performed by the user affect the top most section only and correspondingly changes the remaining sections of the sweep surface (FIG. 16(*b*)). For instance, simply re-orienting the smartphone results in the rotation of the top-most section effectively allowing the user to bend and twist the swept surface. Similarly, using the two-finger gestures allows for panning and scaling the top-most section of the swept surface.

The modification of the shape of the top-most section involves three steps. The user first selects the "Sketch Section" button on the menu 1612 to activate the sketching mode. Once in sketching mode, the user simply sketches a desired curve on the smartphone. In some examples, the user can sketch the section in a single stroke. Every time the user finishes drawing a sketch, the sweep surface is immediately modified according to the new sketched section. Thus, the user can simply keep over-drawing the sketch in order to explore different varieties of shapes. Once satisfied with the modified section, the user finalizes the modification using the "Confirm Section" button on the menu. Similar to shape creation, the swept surface can be detached from the reference plane by using a double tap gesture.

Shape Manipulation: Manipulation of an existing shape involves two steps (FIG. 16(*c*)): hover (S1) and selection (S3). Translating the center of the reference plane inside a swept surface is defined as hovering on the surface. The user can select an object by first hovering 1614 on the object followed by a double tap gesture 1616 on the phone. Similarly, using the double tap on a selected object reverts the state to hover again. Thus, double tap acts as a toggle between the attachment and detachment of a shape from the reference plane. The use of double-tap enables users to perform selection without looking at the controller. Selection signifies the attachment of a 3D object with the reference plane, i.e. all rigid transformations applied on the reference plane are transferred to the selected object. In addition to manipulation, the hover state can also be used to perform operations such as copying, deleting, and coloring a shape by using the menu.

Algorithms for Geometry Creation and Modification

Sweep Surface Generation The sweep surface is represented as a stack of cross-sections. Once the users starts the offsetting interaction, the sweep surface is incrementally generated in three steps: (a) adding a new section and (b) translating the top-section along the reference plane normal at until a stipulated time has elapsed, and (c) repeating addition and translation as long as the user is offsetting the reference plane. This process of incremental generation provides the visual continuity of sweeping to the users and the translation time defines the distance between consecutive sections.

Figure 17:
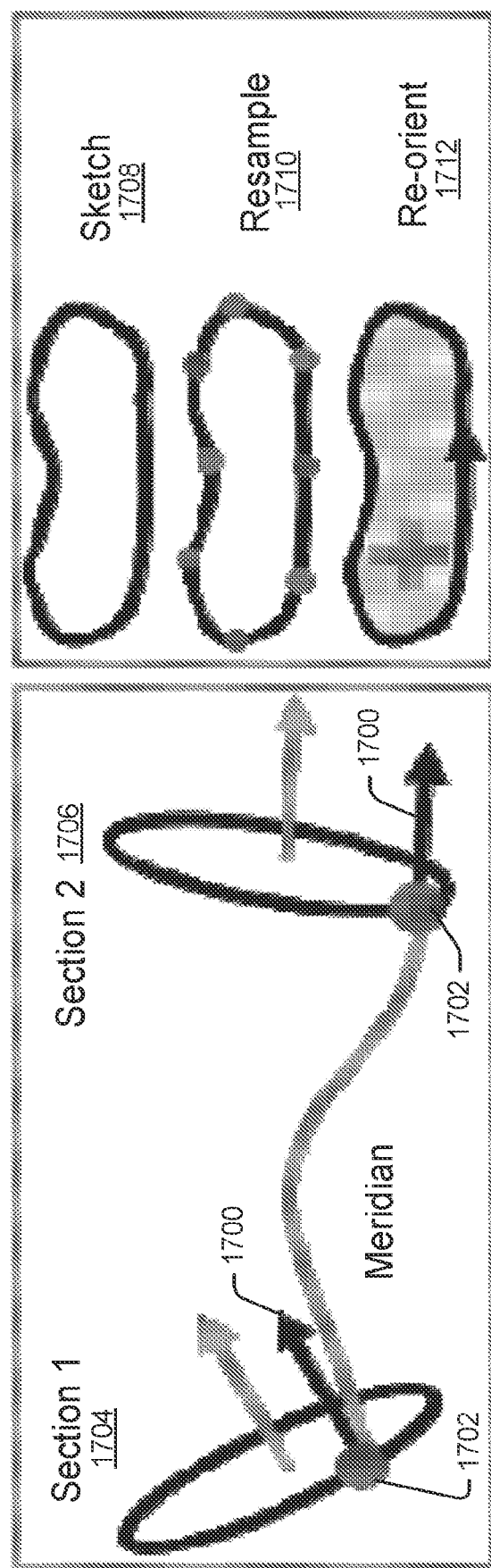
FIG. 17 illustrates algorithms for (a) sweep generation and (b) section sketching.

In this work, we implemented a variant of the control-section based sweeping technique wherein every sweep surface can include or consist of two control sections at the two ends of the sweep surface. Each control section comprises of equal number of points and the information about its local coordinate frame (i.e. the frame of the reference plane). Hence, there is a one-to-one point correspondence between the control sections. For a given pair of control sections, we interpolate each meridian of the sweep surface by using the cubic Hermite basis functions (FIG. 17(*a*)). The interpolation uses four boundary conditions, namely, the position and tangents 1700 at the end points 1702. These are conveniently provided by the vertices and the normal of the section's (1704, 1706) local coordinate frame respectively. Our approach removes the need for explicit computation of the individual section transformations and avoids frame rotation minimization and section blending. This simplifies the operations (e.g., bending, twisting, panning, scaling, or section modification) in the authoring state.

Section Modification: Some examples permit single stroke sketching and the number of points in each section of the sweep surface is constant and pre-defined. Illustrated in FIG. 17, for a sketch input 1708, we first determine if the sketch is an open or a closed curve based on a simple distance threshold between the two end-points of the sketch input. For a closed curve, we implemented a three stage processing of the sketch input (FIG. 17(*b*)). First, we perform an equidistant curve re-sampling 1710 to match the number of points on the sketch to the initial control section of the sweep surface. Subsequently, we determine if the orientation of the curve is the same as that of the initial control section. This involves the comparison between the signs of the areas enclosed by the sketched curve and the initial section. If the initial and sketched sections have opposite orientations, we correct the sketch orientation by reversing the order of vertices in the re-sampled sketch input 1712. Finally, we minimize the twist between the sketch input and the initial section.

Menu Implementation

Figure 18:
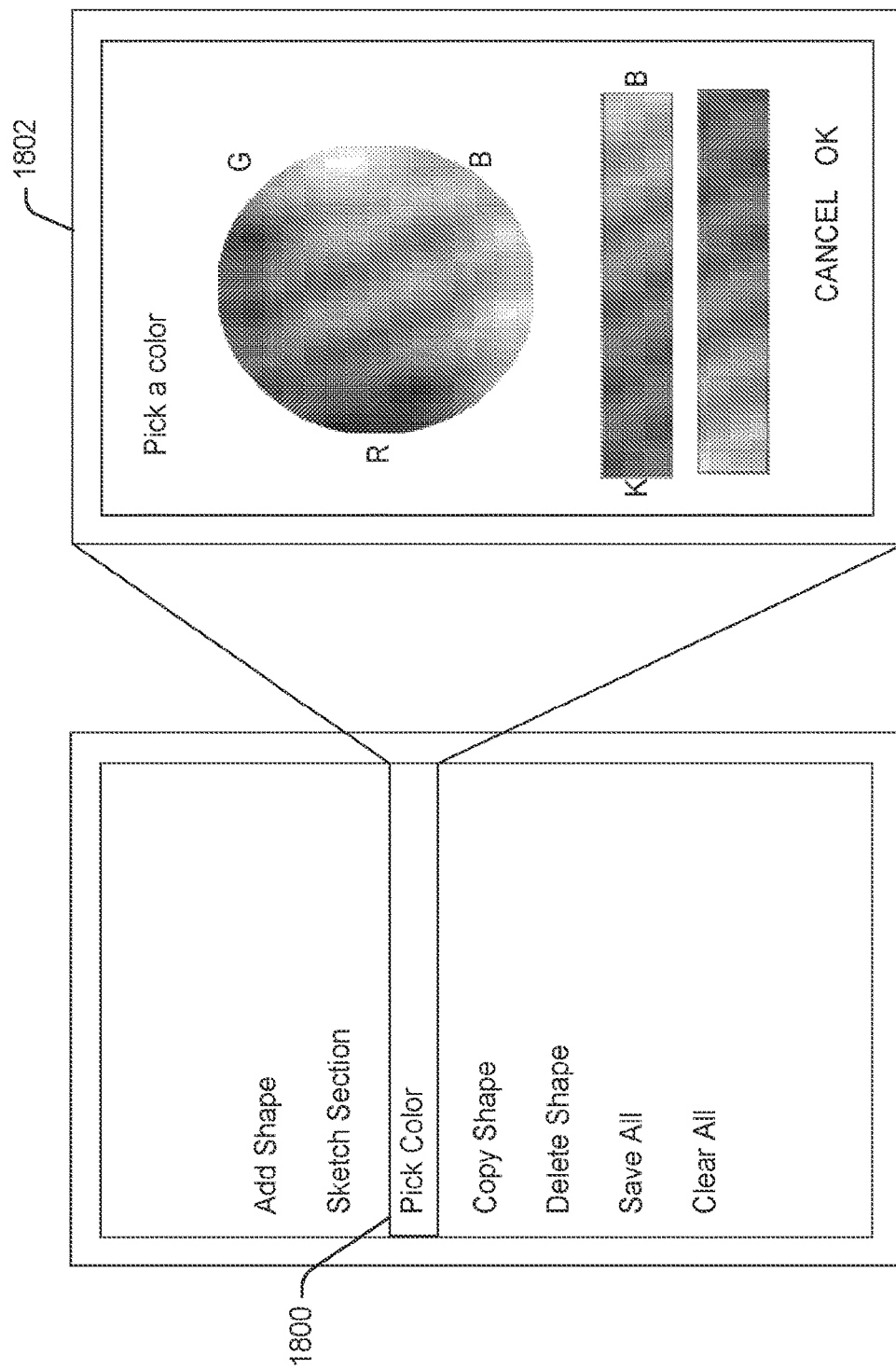
FIG. 18 illustrates a menu (left) showing operations that a user can perform in some examples. A color-picker is shown on the right.

The smartphone application menu (FIG. 18) allows users to start the creation of a sweep surface (Add Shape), provide sketch inputs for modifying sweep sections (Sketch Section), reusing shapes using the Copy Shape operation and perform general tasks (Delete Shape, Save All, and Save & Clear). The transition from the configure (S1) to the author state (S2) is achieved by selecting the "Add Shape" button on the menu. This signifies the intent to begin the creation of a sweep surface. Once the user has expressed the intention to add a shape, the visual representation of the reference plane changes to a circular section. The user can now sweep the section, bend or twist a swept shape, pan and scale a section, or sketch the shape of the section. In all these cases, the reference plane remains attached to the most recent section of the swept surface. Once the user has created a desired shape, the swept surface can be detached from the reference plane by using a double tap gesture, hence bringing the user back to the configure state (S1). In order to apply a color to a shape in a given 3D composition, the user first hovers on a desired shape in the composition. Subsequently, as shown in FIG. 18, the user uses the "Pick Color" button 1800 on the menu in order to specify the color for the shape using the color picker dialog 1802 on the smartphone app.

MOBIFORM

Various examples describe "ubiClay," an embodied approach for digital clay-like 3D modeling. Our main idea is to re-purpose a smartphone as a hand-held proxy for virtual clay, resulting in multi-touch asymmetric bi-manual shape deformation. Guided by the evaluation of touch-based shape deformation, we designed an interaction metaphor that represents a smartphone as a moving region of interest (mROI) on the surface of a virtual 3D model displayed on a larger screen. The direct control of the phone's orientation allows the user to navigate to a region on the surface of a 3D model and simultaneously deform the model using multi-touch gestures on the phone's screen. The combination of direct orientation control with multi-touch input partly emulates the perception of deforming a real piece of clay held in the user's hands.

System Setup

Figure 19:
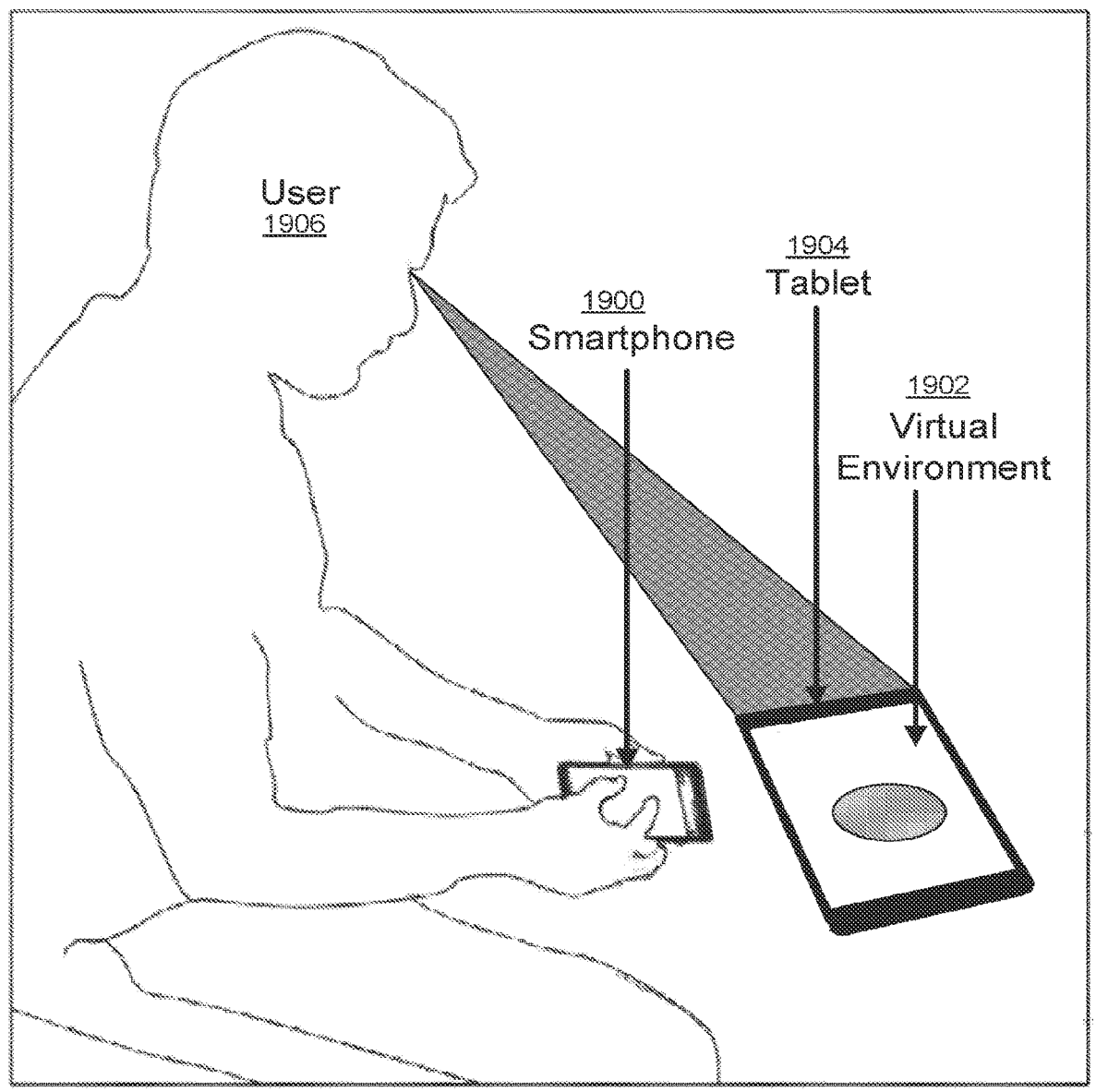
FIG. 19 illustrates a user interacting with a system according to some examples.

Shown in FIG. 19, the ubiClay interface comprises of a hand-held controller (smartphone) 1900, and the virtual environment 1902 (i.e. a modeling application running on a personal computer). We used a 12" Microsoft Surface Pro3 tablet 1904 as the personal computer, and the Samsung Galaxy Note 3 as the hand-held controller that served as the tangible proxy for clay. We implemented a one-way Bluetooth 304 serial port communication to stream input data from the controller (phone) 1900 to the ubiClay application (running on the tablet) 1904. The input data packet included device orientation and touch coordinates of fingers. Our controller interface was implemented using the Android SDK and the application was developed in C++ with OpenGL Shading Language for rendering.

Postural ergonomics was also an important factor in our setup. In order to provide a comfortable posture to users 1906, the virtual environment 1902 was placed horizontally at a height lower than that of the user's 1906 sitting height (FIG. 19). This allowed the user 1906 to manipulate the controller in a constrained mid-air fashion while taking arm support.

Interactions

Figure 20:
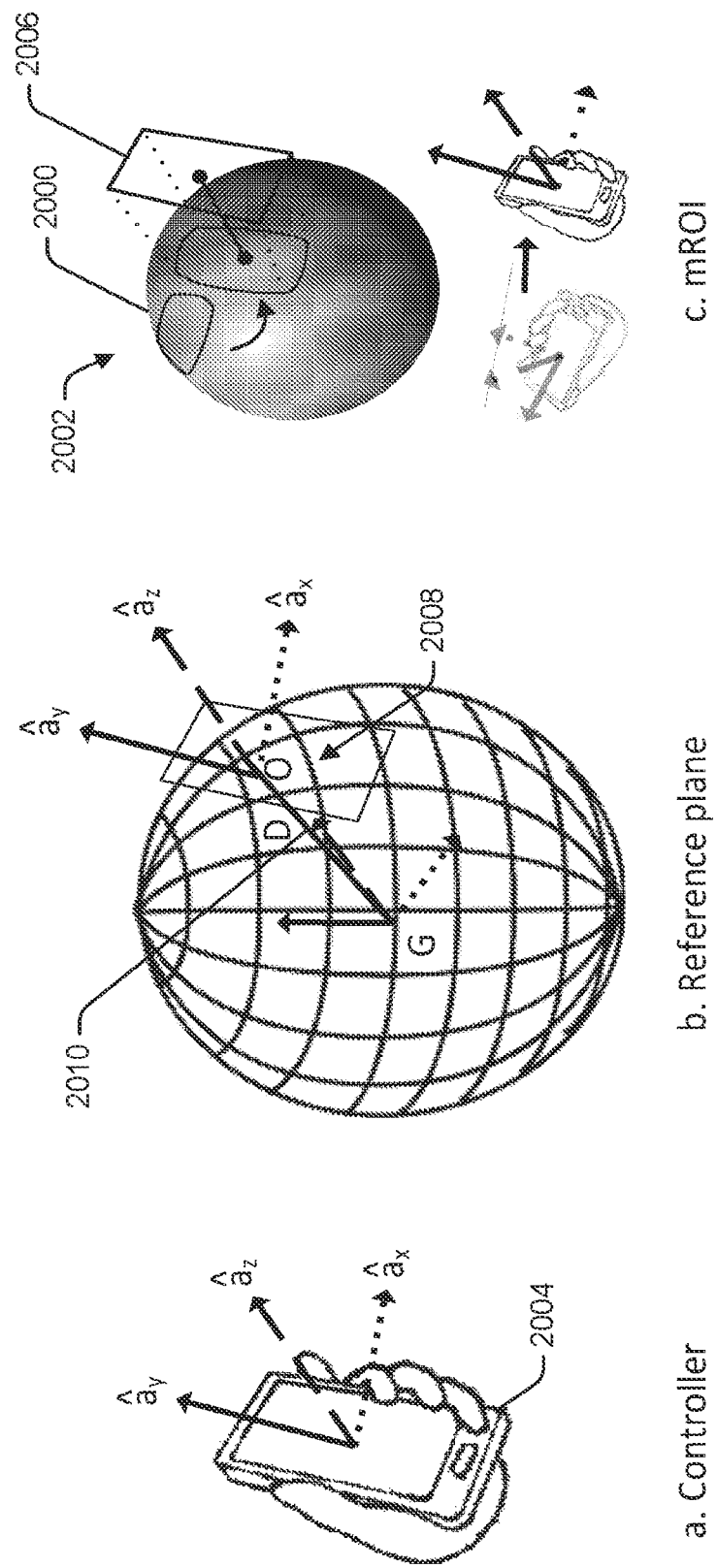
FIG. 20 illustrates a controller's coordinate axes (left) that are mapped to that of a virtual reference plane and the position of the plane is computed by radially offsetting it along $\hat{a}_z$ by a distance D (middle). Here, G is a global coordinate system. The projection of this reference plane on a given 3D model centered at the origin of G defines a moving region-of-interest (mROI) on the model (right).

Phone as a Moving Region-of-interest: In FIG. 20, we begin with the most elemental interaction of ubiClay: selecting a region of interest (ROI) on the surface 2000 of the 3D model 2002. Given a hand-held phone 2004, the objective is to allow the user to specify the ROI on the surface by directly controlling orientation of the phone 2004. As a first step towards this objective, we define a virtual reference plane P 2006 with a coordinate frame, F=(A, O), whose orientation is directly mapped to the coordinate frame of the smartphone 2004 (FIG. 20(*a*)). Here, A=($\hat{a}_x$, $\hat{a}_y$, $\hat{a}_z$) and O=($o_x$, $o_y$, $o_z$) are the axes and center of the coordinate frame respectively. Subsequently, we translate the center O 2008 along $\hat{a}_z$ by some arbitrary distance D 2010 (FIG. 20(*b*)). Finally, the virtual reference plane 2006 is orthogonally projected on the 3D model 2002 along the ray $\hat{r}=-\hat{a}_z$ (FIG. 20(*c*)). Any point p in the plane P can be similarly mapped to a point q on the 3D model 2002. In some examples, this is a ray-casting approach and converts the phone as moving region-of-interest (mROI) on the surface of a given 3D model.

There are two modes of interaction in ubiClay: surface navigation and surface modeling. In this work, our aim is not to build a specific system. Thus, instead of mapping each user action with a specific modeling or navigation operation, we identified a canonical set of interactions that can be used intuitively for a broad category of modeling operations. These modeling operations could be rigid transformations (such as rotation and scaling), sculpting (such as pulling, pushing, or carving) or detailing operations (such as drawing, painting, or texturing). Recent work characterized the expression of deformation intent based on hand grasp and motion in mid-air interactions. Based on this, for each of our interaction modes, we organized our interactions on the basis of the number of fingers and type of motion.

Figure 21:
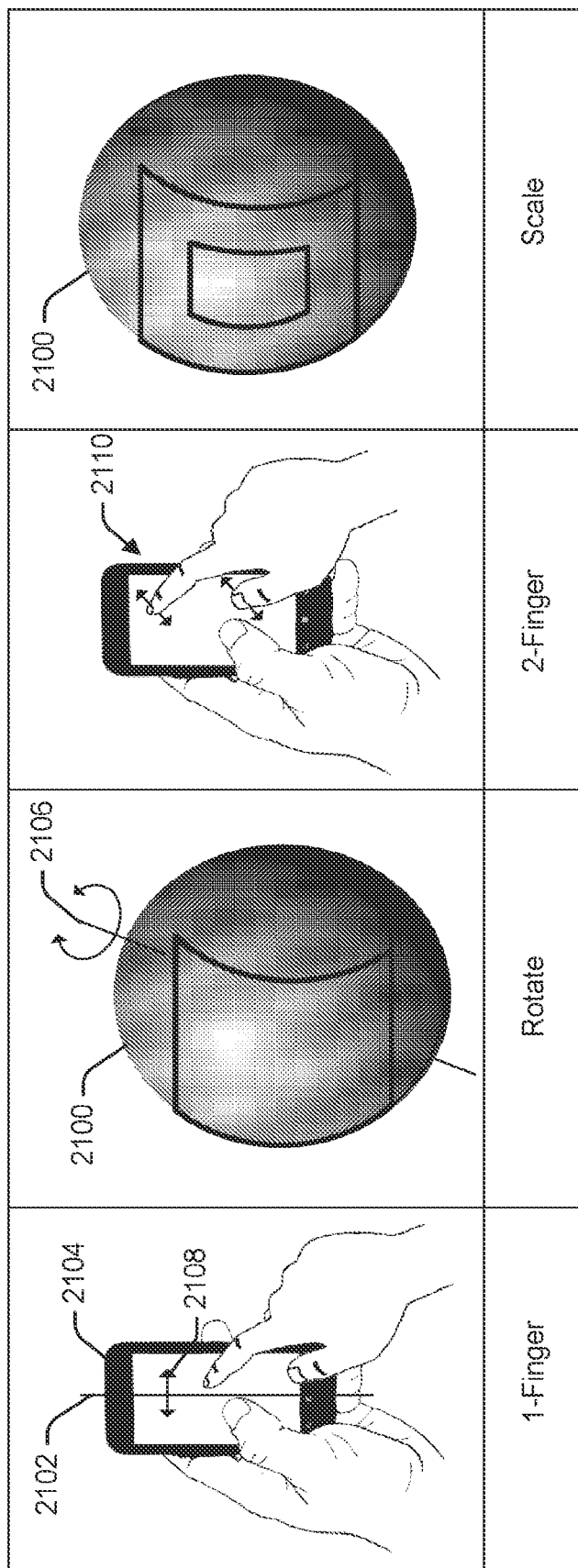
FIG. 21 illustrates interactions for explicit rotation and scaling. One finger swiping on the phone (left) allows users to rotate a 3D model about the axis defined by the y-axis of the phone. Users can also scale the mROI using a two-finger pinching action.

Surface Navigation 1-Finger: The mROI interaction allows users to only navigate on the front-facing region of a 3D modeling. Thus, as shown in FIG. 21, we also provide a one finger method for rotating the object 2100 similar to the tablet interfaces described in the previous sections. Here, the orientation of the y-axis 2102 of the phone 2104 (i.e. $\hat{a}_y$) defines the axis of rotation 2106 and a one-finger swiping action 2108 of the phone 2104 defines the angle (FIG. 21).

2-Finger: Also in FIG. 21, a typical operation in navigation is scaling or zooming that allows users to modify the object 2100 at different resolutions. In ubiClay, this corresponds to scaling the mROI on the object's surface and is performed using the two-finger pinch/spread gestures 2110.

Figure 22:
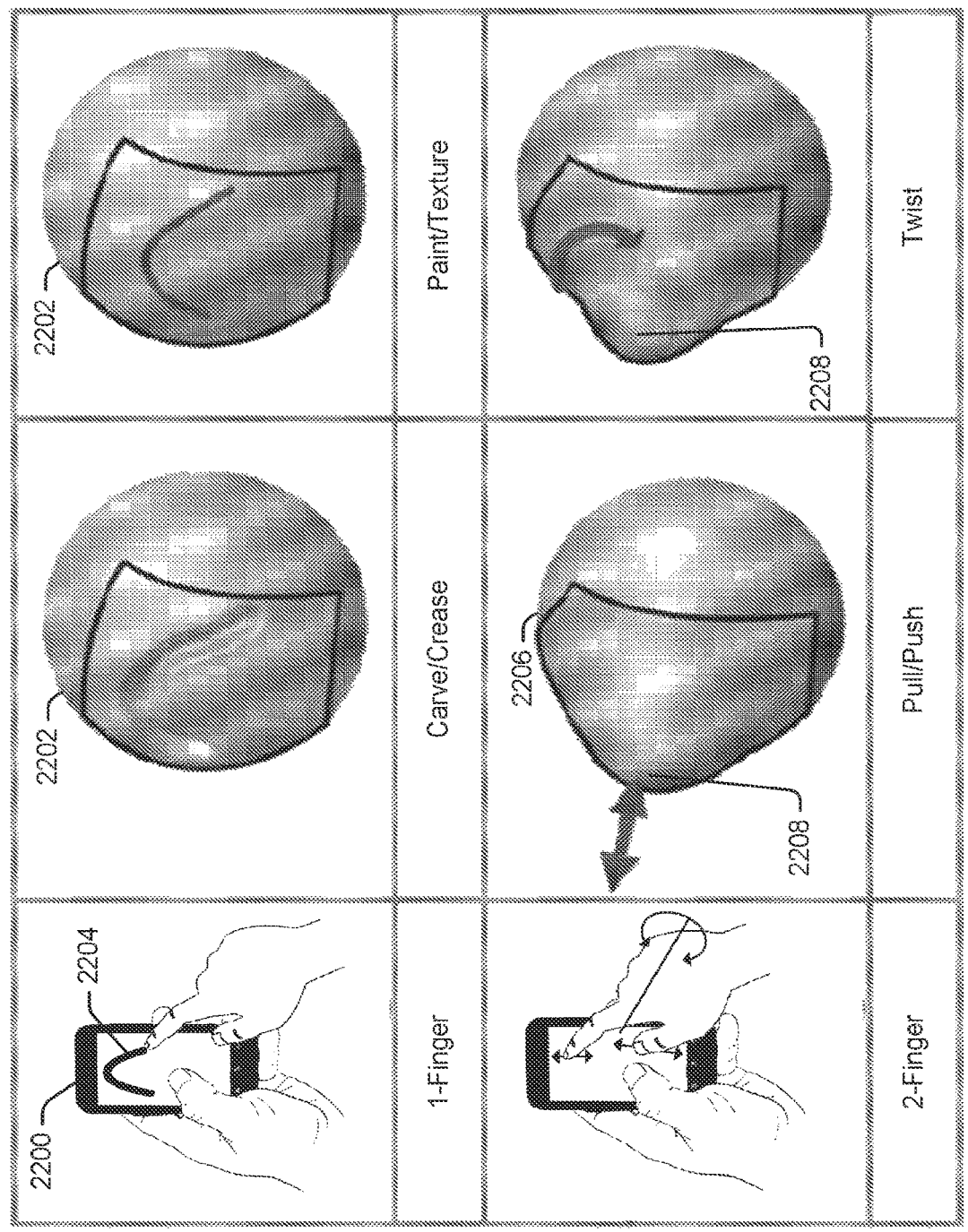
FIG. 22 illustrates a technique for using one finger (top row) and two finger interactions (bottom row). Users can perform modeling operations such as carving, creasing, painting, texturing, and deformation operations such as pulling, pushing, or twisting.

Surface Modeling 1-Finger: In the modeling mode, one-finger actions can be intuitively mapped to inward deformation operations such as pushing and creasing and drawing operations such as painting and texturing (FIG. 22, top row).

Here, the trajectory of the finger on the phone is mapped to the mROI, and so permits transferring a curve from the phone to the 3D model.

1-Finger Hover: One of the most important issues in ubiClay interactions is potential splitting of visual attention while performing precise one-finger operations (especially drawing curves on a 3D model). During a drawing operation, the user can either look at the physical surface that is being drawn upon (i.e. the phone 2200) or at the virtual model 2202 on which the curve 2204 is being mapped. Thus, some examples overcome the lack of a visual feedback as to where the user is potentially going to start drawing in prior schemes. For this, we introduce a one-finger hover interaction. Here, the location of the user's finger in proximity to the phone 2200 is mapped and displayed on the 3D model 2202 without activating the drawing operations.

2-Finger: We map two-finger pinch/spread action to the pulling/pushing deformation operations (FIG. 22, bottom row). The deformation is achieved by performing a pinching gesture on the object 2206. The deformation handle 2208 is defined by the mid-point of the two touch points and the displacement is defined by the amount of pinch as follows:

$$\delta_h = -k(d_t - d_{t-1})  \qquad (1)$$

Here, k>0 is a constant and $d_t$ is the distance between the two fingers (in the pixel space) at time t (measured in frames). Note that while a pinch gesture would allow for an outward displacement (akin to pulling), spreading the two fingers allows for inward displacement of the mesh. We determined the value of k=0.001 through pilot experiments so as to keep the one and two finger approaches similar in terms of their perceived responsiveness (i.e. speed of deformation). In addition to pushing and pulling, we also propose a twisting operation with two fingers. In this case, the action performed by the user is similar to the established 2D rotation gesture in touch-based interactions.

3-Finger: Operations such as smoothing can be used in digital clay modeling according to some examples. In ubi-Clay, this can be achieved a three-finger approach for smoothing of the 3D model surface. This action involves swiping on the phone's screen with three contact points.

In some examples, in order to permit more controllable interactions, the mROI is constrained to lock to its orientation upon detecting a touch or a hover. This can reduce jitter due to the manual control of the mROI, particularly during simultaneous action of orienting the phone and performing touch interactions.

Mode switching Note that both one and two finger interactions can be mapped to either navigation or modeling modes. Thus, we needed an explicit method for the user to switch between these modes. After experimenting with different options (menu on the phone, menu on the virtual environment, widgets on the phone etc.), we found that the problem of split attention adversely affected the overall interaction workflow. We used the physical volume button, located on the side of the phone, to allow users to switch between navigation and modeling modes. We believe that this approach (if comfortable for users) is scalable to additional modes in a design workflow and also adds to the tangibility of our proposed interactions.

MOBISPACE: Mid-Air 3D Modeling Using Tracked Mobile Devices

Mid-air inputs allow users to interact with virtual 3D interfaces using suggestive actions in physical space. Compared to traditional mechanisms, where 2D inputs with a mouse and keyboard are mapped into 3D operations, mid-air inputs provide a more direct and efficient means to manipulate and configure virtual 3D elements. The motion gestures used in such interactions are also easy to learn and apply due to their similarity to actions used in everyday human experiences (e.g. picking, placing, manipulating, pulling, and bending). They also provide a sense of perceptually consistent correspondence between what the user is doing in physical space and the expected outcome in the virtual space, thus bridging the gap between user inputs and system behavior.

Mid-air interactions have been primarily explored as freehand gestures and digital controllers. While free-hand gestures provide flexibility in their usage, they also suffer from issues such as sensitivity to hand occlusions, low tracking fidelity, and inability to provide tactile feedback. Digital controllers on the other hand use a tangible device with powerful electromechanical sensors for 3D inputs. However, such controllers provide limited interactive capabilities as they can be unwieldy to hold and lack adequate event triggering mechanisms. We present a novel method for mid-air interactions, where an ordinary smartphone is repurposed as a 3D interactive medium. In contrast to digital controllers, smartphones provide several advantages. First, given their growing popularity, they are significantly more ubiquitous and accessible than digital controllers. Second, smartphones provide a wide variety of interactive capabilities that are not found in digital controllers. For example, their GUI interface along with multi-touch screen can be used for close range interactions and to provide precise inputs. The presence of motion sensors in smartphones also allows for reliable motion gesture tracking, enabling their use as a 3D input medium. Users can also provide a variety of expressive event triggering mechanisms on the multi-touch surface such as tapping, swiping, pinching, twisting, dragging etc.

In some examples, we use a smartphone as a mid-air input device by combining its innate self-orientation tracking capabilities with spatial position tracking using an external depth camera. Compared to existing methods, some examples do not require installation of digital addendums on the smartphone. Some examples use a non-invasive (wireless) method for both tracking the 6 degrees of freedom motion of the phone and communicating the tracked data to a central computer system. In some examples of a 3D modeling context, the smartphone serves as an interactive medium for conducting all 3D operations using mid-air inputs.

3D Tracking and Mapping

Figure 23:
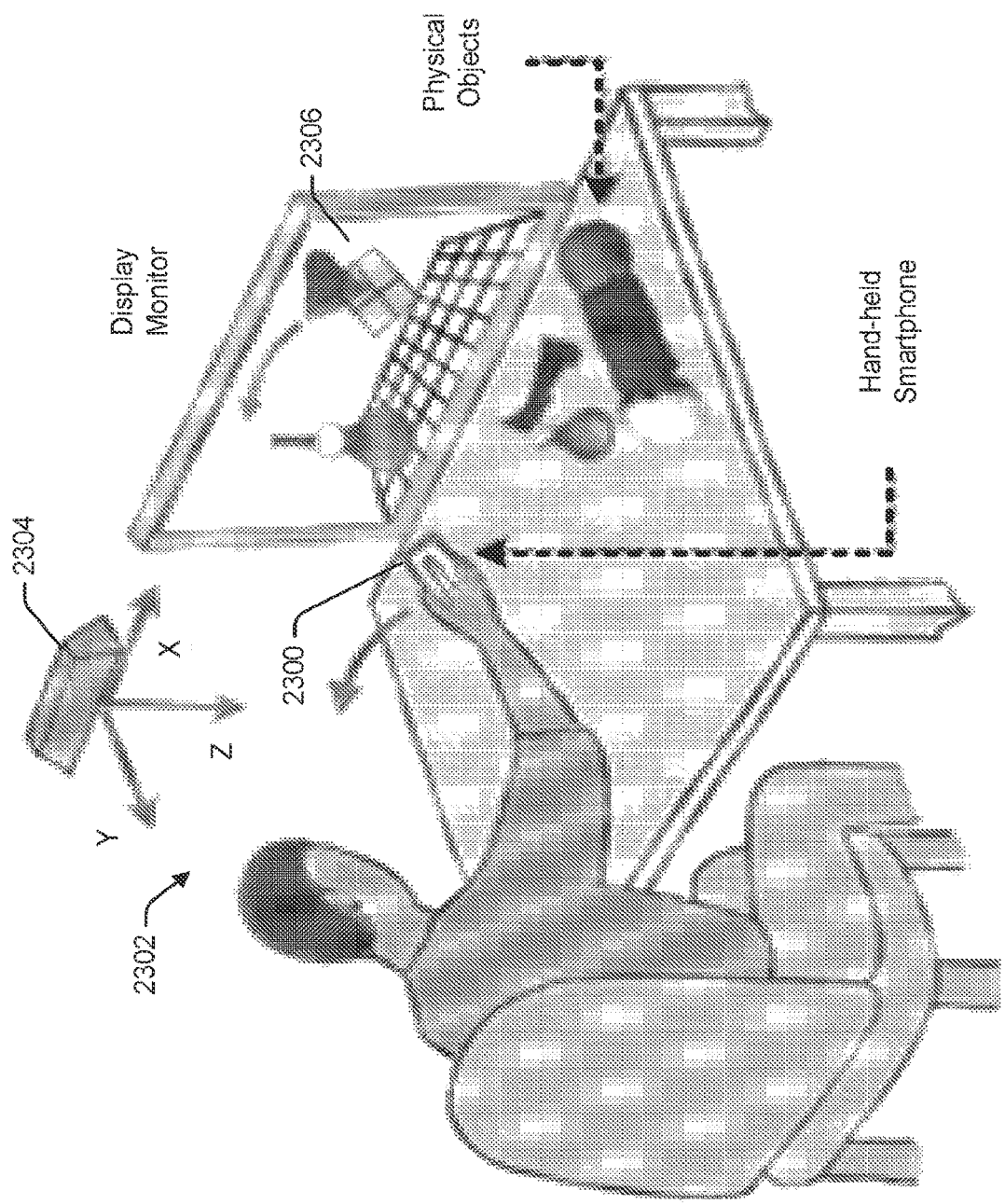
FIG. 23 illustrates a user interacting with a MobiSpace setup according to some examples.

In FIG. 23, to track the smartphone's 2300 3D position, we applied Lucas-Kanade Optical Flow (OpenCV library: 2 pyramid levels, 5×5 search window) on the depth data stream (represented as a gray scale images) from the interaction space 2302. We also use pre-defined depth and dwell-time thresholds of the smartphone 2300 with respect to the depth sensor 2304 to detect tracking initialization (50-60 cm, >1.5 sec) and disengagement (85-100 cm, >1.5 sec). During tracking initialization, the system seeks all pixels with depth values within initialization thresholds, and assigns the median pixel as the initial tracking point. When the user places the phone 2300 on the desk, the tracked point on the smartphone 2300 is maintained within the disengagement threshold, indicating termination of position tracking.

The smartphone's orientation angles are read by the ANDROID app and communicated to the PC via BLUETOOTH. Before system usage, we calibrate the phone's twist offset by placing it on the desk (roughly aligned with the sensor's Y) and measuring the angle between sensor Y and magnetic north. Subtracting this offset value from the measured yaw angle at each frame, gives the phone's twist angle about global Z.

We define the depth sensor's 2304 coordinate frame (FIG. 23) as the global frame of reference. Since the depth sensor 2304 is facing vertically downwards, the smartphone's position can be linearly mapped into the 3D scene 2306. In some examples, a 5 mm motion of the phone 2300 gets mapped as a 0.12 unit displacement of the planar cursor. Similarly, the phone's tilt (pitch and roll) and twist angles can also be directly used as the cursor's orientation in the 3D scene.

Figure 24:
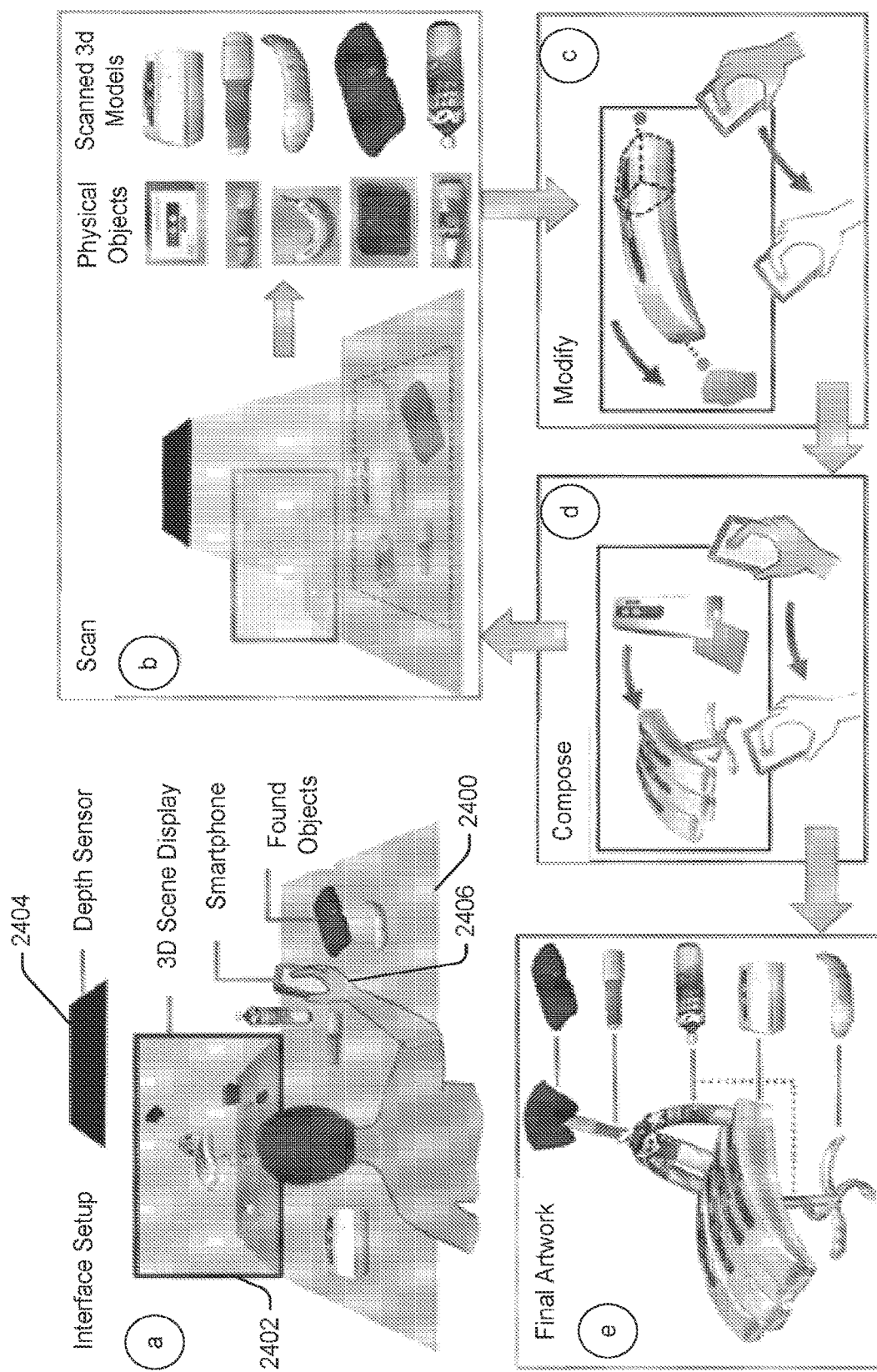
FIG. 24 illustrates (a) a schematic of a typical physical setup used in the MobiSpace workflow, (b-c) three stages of the MobiSpace workflow: (b) 3D scanning of a physical objects to create corresponding 3D models with texture mapped on to the models, (c) interactive modification of the scanned shapes using a smartphone in mid-air, (d) spatial assembly of different shapes during artwork construction, and (e) final artwork or design constructed from the workflow.

Shown in FIG. 24, we implemented a preliminary 3D interface (FIG. 24(*a*)) to demonstrate the MobiSpace workflow. Some examples use off-the-shelf components to reduce the effort of custom implementation and improve system robustness. The interface can be integrated within an ordinary computer desk 2400 and comprises of: (i) a monitor 2402 to display digital content, (ii) an overhead RGB-D sensor 2404 for motion tracking and 3D scanning, and (iii) a smartphone 2406 for interacting with the 3D modeling scene.

Figure 25:
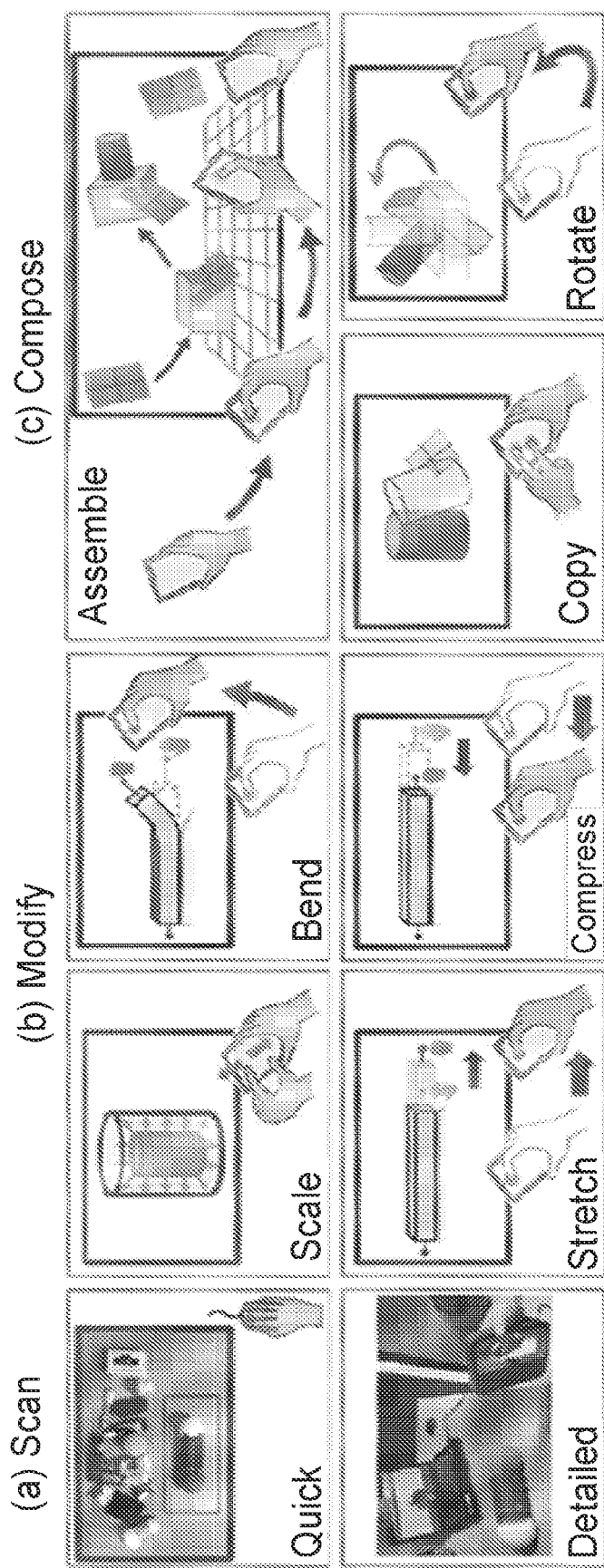
FIG. 25 illustrates unit operations achieved by combining mid-air tracking of a mobile device with concurrent multi-touch gestures in the MobiSpace embodiment.

FIG. 25 illustrates user interactions with this interface during the three stages of the MobiSpace workflow.

The following sections provide a 3D modeling scenario, where virtual 3D models (acquired from a 3D digital scanning process) are composed into 3D collages to support artistic and design ideation. The modeling steps can be broadly classified as the following activities.

Modify and Compose

We used mid-air interactions for the modify and compose states, as they allow users to express 3D modeling operations via intuitive actions (e.g. picking, placing, manipulating, pulling, and bending). Additionally, when constructing artwork in MobiSpace, they also provide a sense of physical engagement and spatial mobility, relatable to the physical act of assembling objects.

To select an appropriate mid-air modality, we first explored unimanual free-hand gestures using Softkinetic and LeapMotion systems. Our tests however revealed that they either lacked adequate tracking fidelity or had a small interaction space. We also found bimanual free-hand gestures unsuitable for subtle shape manipulations required in MobiSpace. Given such limitations, we explored using a planar cardboard proxy as a surrogate for the dominant hand. Even though it improved tracking and provided passive haptic feedback, the proxy lacked a medium for secondary inputs (e.g. selection, scaling etc.). Thus, we found smartphones to be a natural extension of the planar proxy, as they retain the planar interaction metaphor while providing a collocated surface for multi-touch inputs. We acknowledge that hand-held controllers can also provide similar capabilities, but rejected them due to commonality of smartphones. During mid-air interactions, we use the RGB-D sensor and the smartphone's IMU sensor to track the phone.

Figure 26:
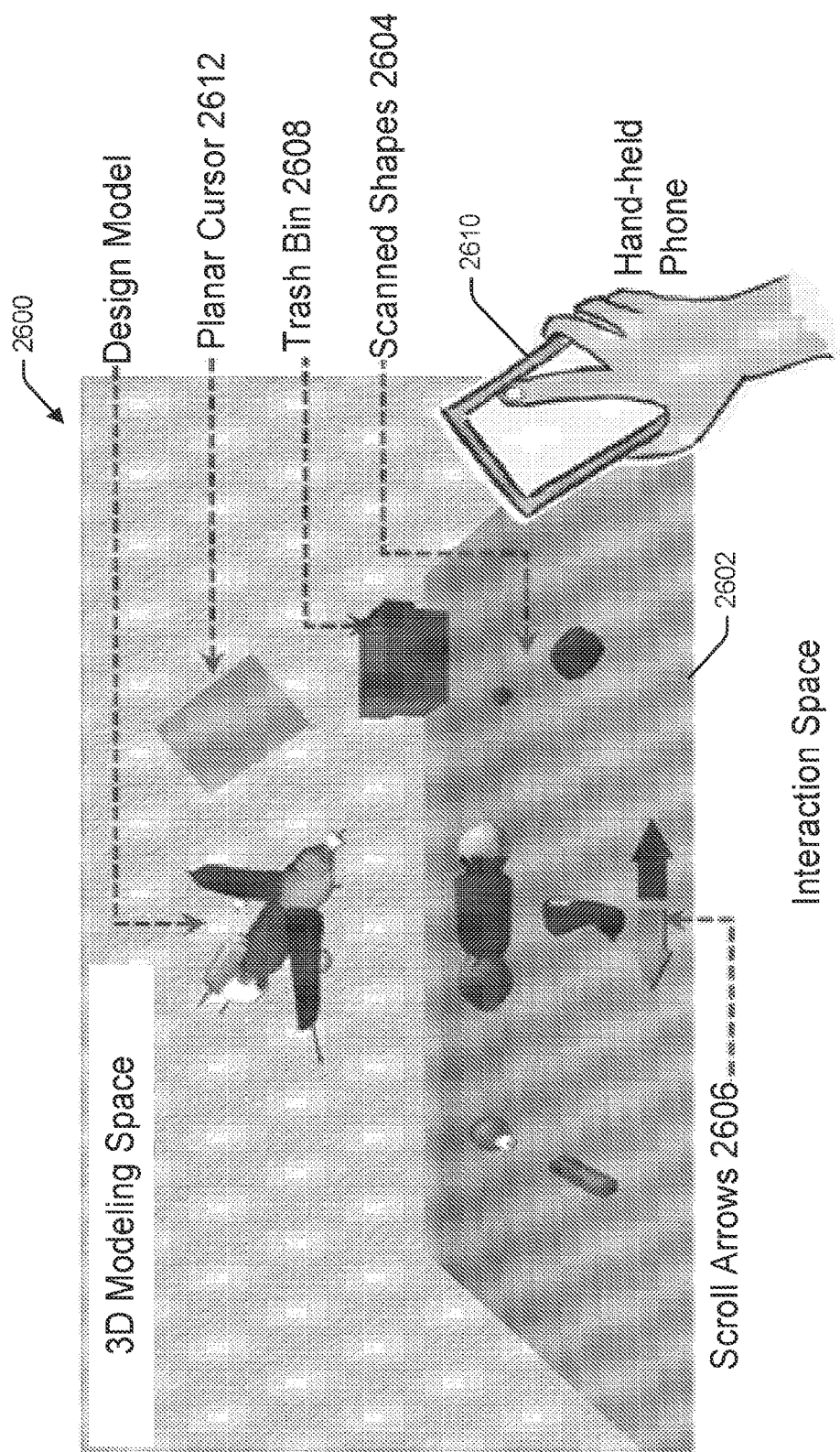
FIG. 26 illustrates a 3D modeling scene displayed on a computer monitor using Mobi Space.

In FIG. 26, the 3D composition scene 2600 resembles the interaction space, and can include or consist of a horizontal desk 2602 over which scanned shapes 2604 are laid out. To avoid clutter, only 6 shapes are displayed at a time, but the scroll arrows 2606 allow access to non-displayed shapes. Since we use a flat screen display, shadows are rendered on the desk surface to assist user depth perception. The trash-bin 2608 is used for discarding unwanted shapes. Users can indicate intent to start interacting with the 3D scene by raising the smartphone 2610 towards the sensor (2404 of FIG. 24). This gesture activates a planar cursor 2612 inside the 3D space 2600. Since the smartphone's spatial parameters are mapped onto this cursor, its 6DOF motion is directly controlled by holding and moving the phone 2610 in mid-air. To disengage the cursor, users can simply place the phone 2610 on the desk 2602. In addition, touch gestures on the phone 2610 allow users to indicate specific intent like grab, release, scale, and replicate. The following shape composition operations can be performed.

Shape Selection and Manipulation. A bounding box around a shape appears whenever the cursor is close enough to select it. As shown in FIG. 25(*c*)-top, the planar cursor is first "sliced into" the shape along a convenient direction. A single tap gesture is then used to attach the shape onto the cursor, enabling its spatial control via manipulation of the cursor. A single tap gesture is also used to release the shape at a stationary location.

Design Composition. By using the planar cursor, shapes can be individually picked up and assembled into a 3D collage. At any point during this process, users can rotate or translate the assembly to change its viewpoint. For translation, the cursor is first brought close to the assembly center. A touch-and-hold gesture along with the cursor motion are used, respectively, to clutch and translate the assembly. The same interaction is used for assembly rotation, except here the cursor is place away from the assembly center. Additional, the cursor's motion is used to pivot the assembly about its center via a rotation handle. Our system also allows creation of sub-assemblies that can be combined later.

Shape Modification. A given shape in an assembly can be selected for modification by first bringing the cursor close to it and applying a double tap gesture. Within this state, a two finger pinch gesture (inward or outward) uniformly scales the selected shape. To deform the shape, users can "grab" either one of its axial endpoints with the cursor using a touch-and-hold gesture, and move the cursor in the direction of shape elongation, compression, or bending. During shape modification state, open and closed hand icons (instead of the planar cursor) indicate proximity to and clutching of the shape end-point.

Copy. Any shape within the sculpture can be copied multiple times. The interaction for this is similar to shape selection, except here we use a two-finger tap gesture. This operation is particularly useful for creating patterns of identical shapes.

Undo. The undo command can be invoked by using a three-finger tap gesture. It allows users to revert a 3D design back for up to the last five configurations.

Delete. Users can choose to discard any shape from the design by picking it up and releasing it over the trash-bin.

Advanced 3D Modeling Operations

Figure 27:
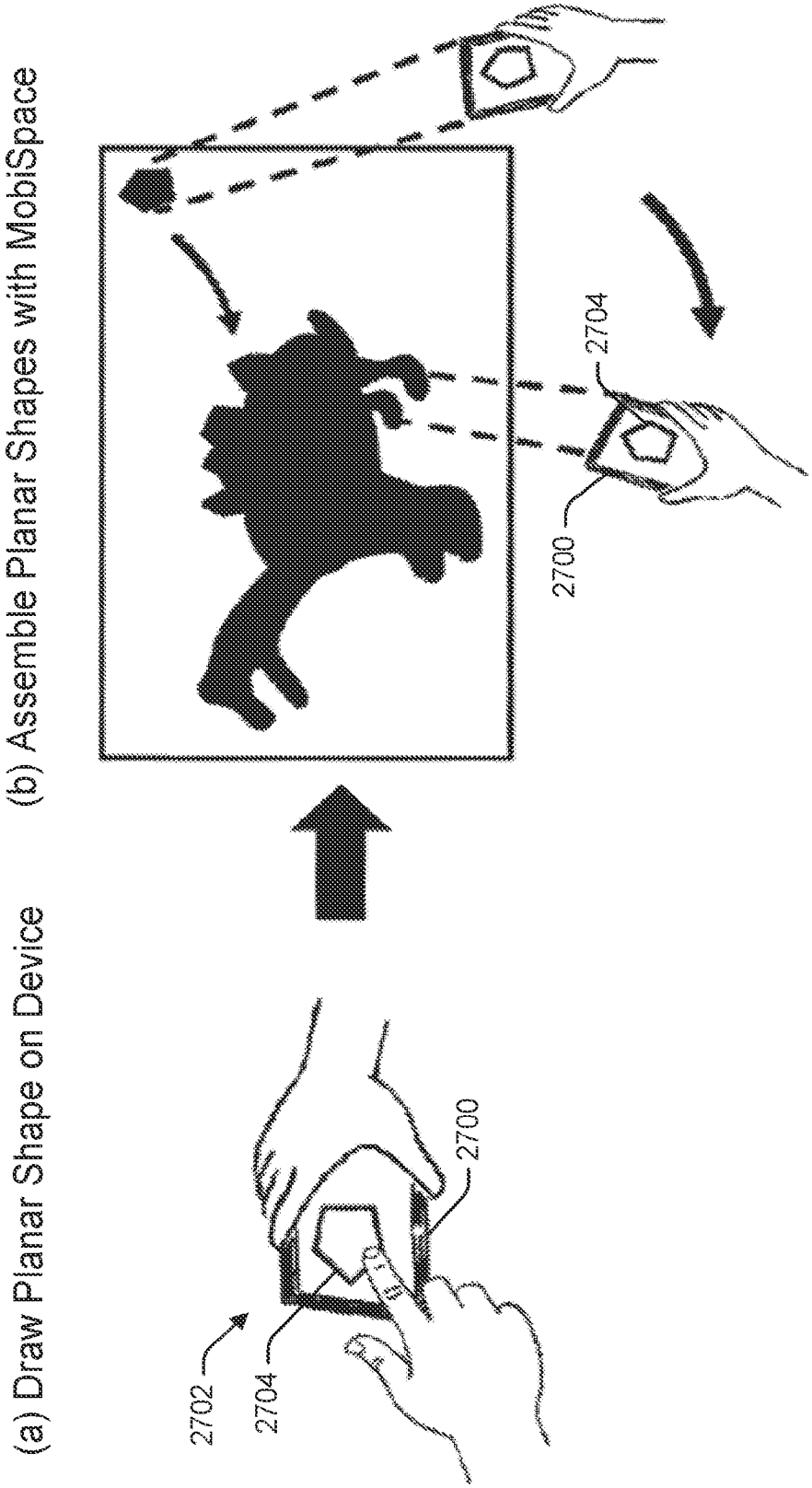
FIG. 27 illustrates planar shape assembly according to techniques of some examples.

To demonstrate advanced 3D modeling operations using MobiSpace, we present a planar shape assembly application, where planar shapes are spatially configured to create meaningful virtual 3D models. Here, and as shown in FIG. 27, the smartphone 2700 provides multi-level affordances. First, users can directly draw 2702 the profile of planar shapes 2704 on the device 2700 itself (FIG. 27(*a*)). Subsequently, they can use the MobiSpace system to spatially manipulate and assemble the shapes 2704 one at a time (FIG. 27(*b*)). Here, because the planar shape 2704 is directly drawn on the device 2700, it serves a physical container for the shape 2704. Given the planarity of the device 2700, users can thus vicariously configure the shape 2704 as if they were actually holding the shape itself. Using this context, we present the following advanced modeling capabilities that can be achieved using MobiSpace.

While mid-air inputs with a mobile can provide reasonable controllability during 3D shape manipulations, it does not afford the precision found using GUI-based tools. In our system, we utilize context-specific constraints on the mid-air inputs to interpret them as more structured 3D interactions. Such constraints are automatically inferred by the system, and used to assist design of structured geometry, complex details, and aesthetic features.

Assembly Constraints. During assembly, if a newly added shape intersects with pre-existing assembly shapes, its orientation is automatically adjusted to be orthogonal to the adjoining neighbors. This ensures physical connectivity of the shapes during fabrication and also provides a structured appearance in the assembly. By imposing orthogonality between adjoining planar shapes, the limited accuracy of mid-air interactions could be compensated for, allowing users to provide precise inputs, based on the context. The application of assembly constraints is generalizable to more generic forms of shapes, where other geometric relationships such as mating surfaces, concentricity, and insertions can drive automatic constraint application.

Figure 28:
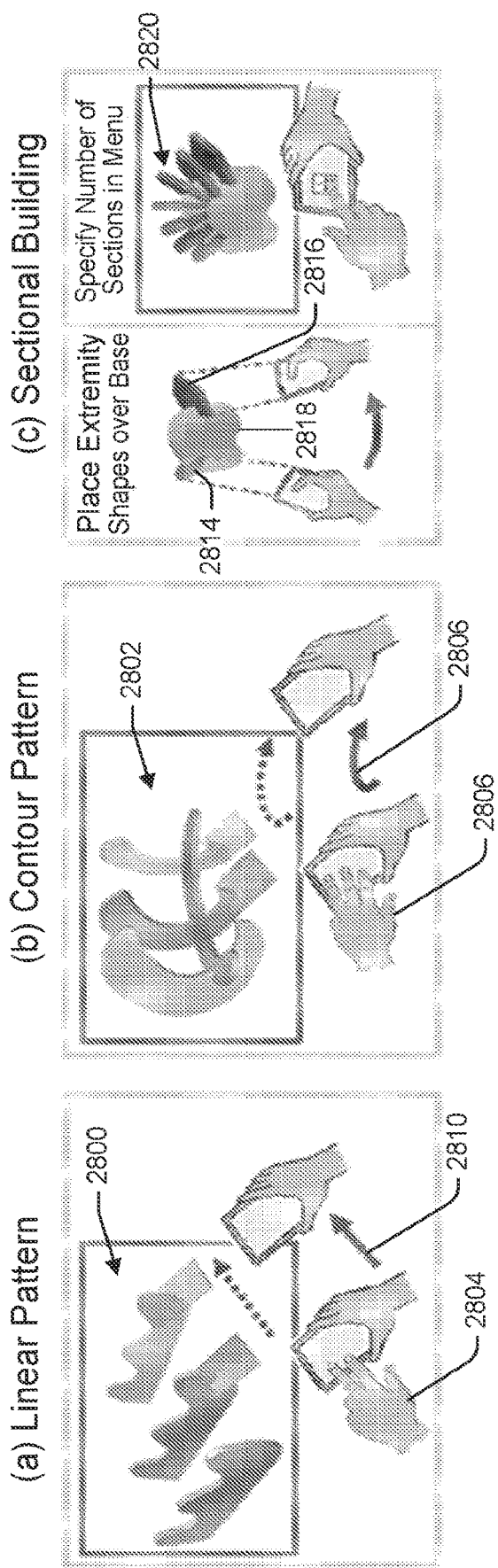
FIG. 28 illustrates using MobiSpace to perform 3D modeling scene displayed on a computer monitor.

Procedural Operations. MobiSpace enables procedural operations, allowing users to create regular geometry within an assembly for aesthetic design and structural fidelity. Here, we enable two types of procedural operations. In the first, users can create a parallel pattern of identical shapes along a linear path 2800 (FIG. 28(a)) or the contour of another shape 2802 (FIG. 28(b)). For this, a two finger 2804 or three finger 2806 single tap gesture indicates the type of patterning, and generates a copy of the shape hovered over by the cursor. The device's motion 2810 then defines the translation and placement of the copied shape along a constrained path. Users can also create a blended pattern between two non-identical shapes 2812 (FIG. 28(c)) by first placing two end point shapes (2814, 2816) over a base shape 2818, and indicating the number of intermediate shapes 2820 in the blend menu (displayed on the device). The intermediary shapes are obtained by interpolating corresponding vertices between the two end-point shape profiles. This operation, in addition to utilizing the 3D interactive capabilities of MobiSpace, also leverages the GUI display of the device to provide menu based alphanumerical inputs.

Figure 29:
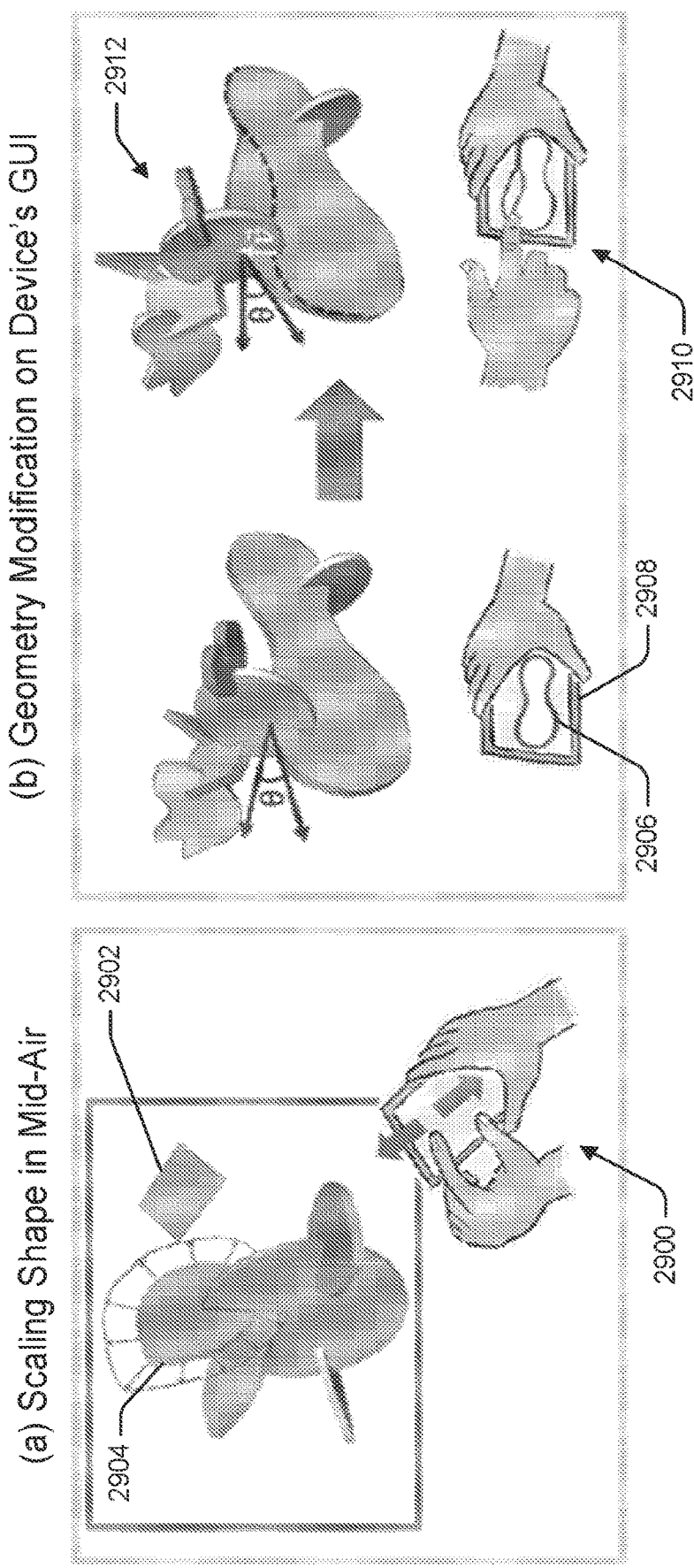
FIG. 29 illustrates two modes of shape modification using the MobiSpace setup: (a) coarse mid-air inputs to scale a component's size within an assembly model, (b) user capturing the critical geometric features of a component on the device's GUI for their subsequent modification using controlled inputs.

Multi-modal Shape Modification. The individual components of a 3D design model can be modified either in 3D space or the device's GUI, depending on the precision requirements and the nature of modification inputs. We use the planar shape assembly context to demonstrate such bimodal shape modification scheme. In FIG. 29, by applying a two-finger pinch gesture 2900 (similar to zooming in mobile devices) while hovering the cursor over a planar shape 2902, the shape 2904 is uniformly scaled within the assembly (FIG. 29(a)). This interaction represents modification in mid-air, where a coarse multi-touch gestures is used to indicate modification operations on a 3D component.

Likewise, in FIG. 29, a 2D geometry can also be modified on the GUI display of the device 2906 29(b)). Here, the critical geometric attributes 2906 are captured on the device 2908, allowing users to provide controlled and more precise inputs towards its modification 2910. Such changes are then reflected in the corresponding shapes in the 3D assembly model 2912. This is analogous to brushing-and-linking in data visualization, where identical data within different spaces maintain a consistent representation.

Throughout this description, some aspects are described in terms that would ordinarily be implemented as software programs. Those skilled in the art will readily recognize that the equivalent of such software can also be constructed in hardware, firmware, or micro-code. Because data-manipulation algorithms and systems are well known, the present description is directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Figure 30:
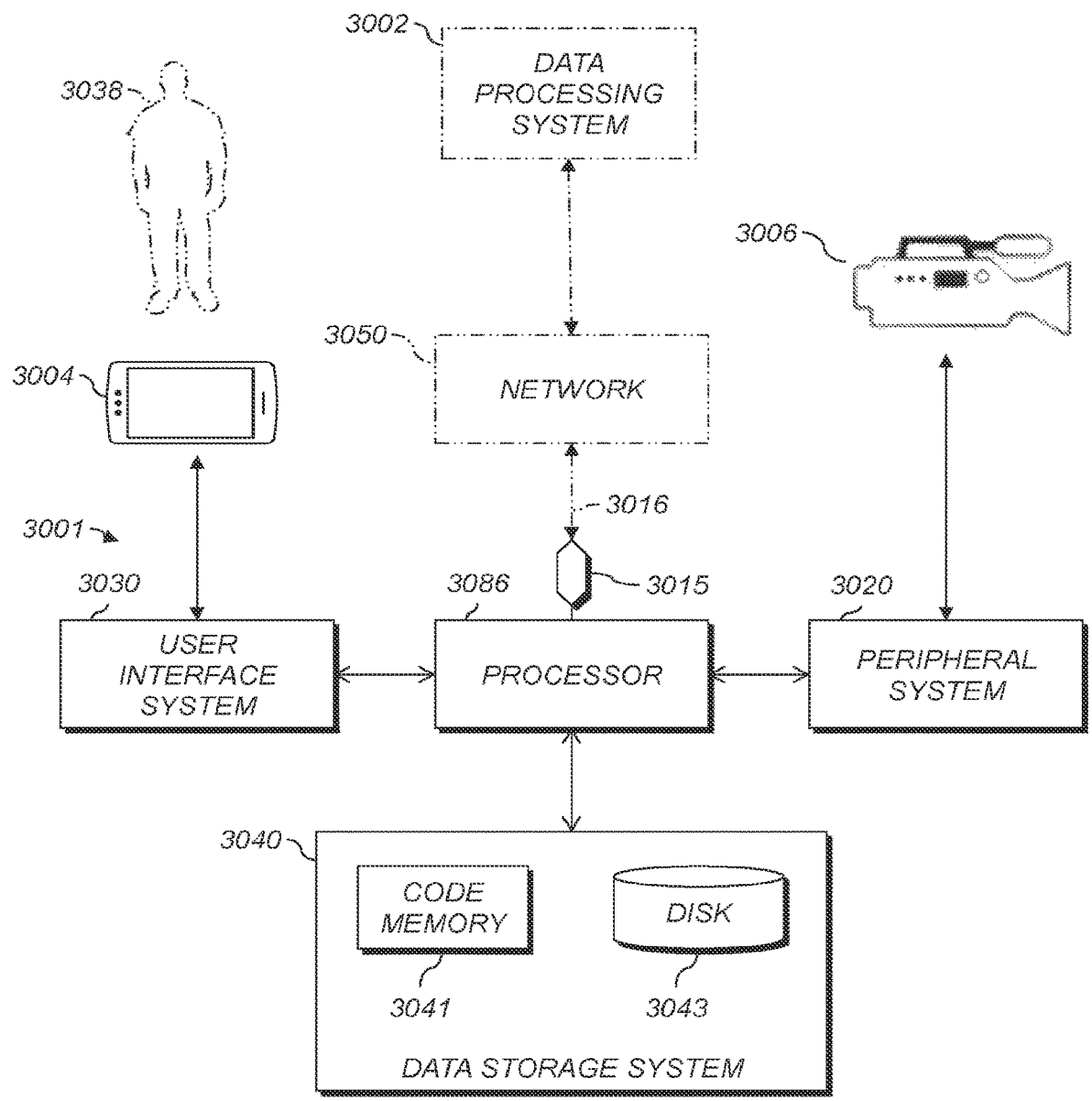
FIG. 30 illustrates a high-level diagram showing the components of a data-processing system.

FIG. 30 is a high-level diagram showing the components of an exemplary data-processing system 3000 for analyzing data and performing other analyses described herein, and related components. The system 3000 includes a processor 3086, a peripheral system 3020, a user interface system 3030, and a data storage system 3040. The peripheral system 3020, the user interface system 3030 and the data storage system 3040 are communicatively connected to the processor 3086. Processor 3086 can be communicatively connected to network 3050 (shown in phantom), e.g., the Internet or a leased line, as discussed below. Techniques shown in FIGS. 1-29, e.g., for receiving and processing user input, can be carried out by systems or devices incorporating one or more of systems 3086, 3020, 3030, 3040, and can each connect to one or more network(s) 3050. Processor 3086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 3086 can implement processes of various aspects described herein. Processor 3086 and related components can, e.g., carry out processes for manipulating a 3D image with a mobile device 3004, such as processes described above. The mobile device 3004 is manipulated by a user 3038 such as by rotating the mobile device 3004, moving the mobile device 3004 through space, touching a touch screen on the mobile device 3004, or activating a button or switch on the mobile device 3004. The mobile device 3004 detects these manipulations using onboard sensors and input devices to provide an indication of the manipulation to the processor 3086 or other portion of the data processing system 3002. The indication may be sent via the network 3050 as a wired or wireless communication. The indication may also be sent via another communication channel. The mobile device 3004 can be part of system 3001 or separate therefrom but communicatively connectable therewith.

Processor 3086 can be or include one or more device(s) for automatically operating on data, e.g., a central processing unit (CPU), microcontroller (MCU), desktop computer, laptop computer, mainframe computer, personal digital assistant, digital camera such as 3D camera system 3006, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 3020, user interface system 3030, and data storage system 3040 are shown separately from the processor 3086 but can be stored completely or partially within the processor 3086.

The peripheral system 3020 can include or be communicatively connected with one or more devices configured or otherwise adapted to provide digital content records to the processor 3086 or to take action in response to processor 3086. For example, the peripheral system 3020 can include digital still cameras, digital video cameras, 3D camera systems such as 3D camera system 3006, cellular phones, or other data processors. The processor 3086, upon receipt of digital content records from a device in the peripheral system 3020, can store such digital content records in the data storage system 3040.

The user interface system 3030 can convey information in either direction, or in both directions, between a user 3038 and the processor 3086 or other components of system 3000. The user interface system 3030 can include a mouse, a keyboard, another computer (connected, e.g., via a network or a null-modem cable) such as the controller client, or any device or combination of devices from which data is input to the processor 3086. The user interface system 3030 also can include a display device, a processor-accessible memory, or any device or combination of devices to which data is output by the processor 3086. The user interface system 3030 and the data storage system 3040 can share a processor-accessible memory.

In various aspects, processor 3086 includes or is connected to communication interface 3015 that is coupled via network link 3016 (shown in phantom) to network 3050. For example, communication interface 3015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WI-FI or GSM. Communication interface 3015 sends and receives electrical, electromagnetic or optical signals that carry digital or analog data streams representing various types of information across network link 3016 to network 3050. Network link 3016 can be connected to network 3050 via a switch, gateway, hub, router, or other networking device.

In various aspects, system 3000 can communicate, e.g., via network 3050, with a data processing system 3002 or with mobile device 3004, each of which can include the same types of components as system 3000 but is not required to be identical thereto. Systems 3000 and 3002, and mobile device 3004, can be communicatively connected via the network 3050 (e.g., a cellular, BLUETOOTH, or WIFI network). At least one of system 3000, system 3002, or mobile device 3004 can execute respective computer program instructions to perform aspects of some examples, whether independently or in mutual coordination. Some examples include system 3000 and mobile device 3004 but not system 3002.

Processor 3086 can send messages and receive data, including program code, through network 3050, network link 3016 and communication interface 3015. For example, a server can store requested code for an application program (e.g., a JAVA applet) on a tangible non-volatile computer-readable storage medium to which it is connected. The server can retrieve the code from the medium and transmit it through network 3050 to communication interface 3015. The received code can be executed by processor 3086 as it is received, or stored in data storage system 3040 for later execution.

Data storage system 3040 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 3086 can transfer data (using appropriate components of peripheral system 3020), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 3040 can be a tangible non-transitory computer-readable storage medium, i.e., a non-transitory device or article of manufacture that participates in storing instructions that can be provided to processor 3086 for execution.

In an example, data storage system 3040 includes code memory 3041, e.g., a RAM, and disk 3043, e.g., a tangible computer-readable rotational storage device or medium such as a hard drive. Computer program instructions are read into code memory 3041 from disk 3043. Processor 3086 then executes one or more sequences of the computer program instructions loaded into code memory 3041, as a result performing process steps described herein. In this way, processor 3086 carries out a computer implemented process. For example, steps of methods described herein, blocks of the flowchart illustrations or block diagrams herein, and combinations of those, can be implemented by computer program instructions. Code memory 3041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 3086 (and possibly also other processors), and that, when loaded into processor 3086, cause functions, acts, or operational steps of various aspects herein to be performed by processor 3086 (or other processor). Computer program code for carrying out operations for various aspects described herein may be written in any combination of one or more programming language(s), and can be loaded from disk 3043 into code memory 3041 for execution. The program code may execute, e.g., entirely on processor 3086, partly on processor 3086 and partly on a remote computer connected to network 3050, or entirely on the remote computer.

Illustrative Embodiments and Clauses

Any of these embodiments or clauses can be carried out by data-processing system 3000, as described herein with reference to FIG. 30. The data-processing system can permit interpreting sensor data of the listed user gestures or actions and providing the listed effects on, e.g., virtual 3D models.

Embodiment 1 (e.g., MobiSpin, above): Use a mobile device to detect a reference plane and a virtual pointer in a 3D interaction space defined inside a separate virtual space such that the reference plane and the pointer can be:
  Rotated directly by rotating the mobile device;
  Translated by using touch gestures by the user on the screen of the mobile device OR by directly detecting the location of the mobile device using a 3D camera system.
  Used for selecting 3D virtual object, in whole or in parts
  Used for changing the view of the scene rendered to visually describe the separate virtual space either on a separate display screen, a virtual reality device, an augmented reality device, or a completely different computer.

Embodiment 2: Embodiment 1 such that the reference plane (Floating Canvas) associated with mobile device can be:
  Used to select a single object from a collection of multiple objects in the separate virtual space
  Used to select a region on the surface of a 3D object in the separate virtual space
  Used to translate and rotate a virtual object after selecting the object
  Used to create planar and non-planar curves in the separate virtual space
  Used to change the viewing direction and location of the scene describing the virtual space by translating and rotating a virtual camera that is being used to render the scene Embodiment 3: Embodiment 1 or 2 such that the pointing line (Laser Pointer) associated with mobile device can be:
  Used to select a single object from a collection of multiple objects in the separate virtual space
  Used to select a region on the surface of a 3D object in the separate virtual space
  Used to translate and rotate a virtual object after selecting the object
  Used to change the viewing direction and location of the scene describing the virtual space by translating and rotating a virtual camera that is being used to render the scene Embodiment 4: (e.g., MobiCAD): Use of a mobile device to detect a datum plane that is used to create, select, modify and assemble whole or parts of virtual objects wherein:
  The category of virtual objects includes a parametric and feature-based 3D models (including straight protrusions and solids of revolution) defined by the boundary representation of the volume enclosed by the object;
  The creation of the protrusions is performed by:
    Aligning the mobile device to one of the standard reference planes (top, side, and front) incremental and dynamic addition of cross-sections
    Subsequently, sketching the shape of the object as seen in the aligned view (plan, elevation)
    Finally, specifying the magnitude of protrusion by using the mobile device screen in input numerical values.
  The creation of the solids of revolution is performed by:
    Aligning the mobile device to one of the standard reference planes (top, side, and front)
    Subsequently, sketching the shape of the object as seen in the aligned view (plan, elevation)
    Finally, specifying the angle of revolution by using the mobile device screen in input numerical values.
  The orientation of the mobile device is used to direct a virtual pointer in the virtual space to select distinct features such as vertices, edges, and faces on the 3D objects
  The modification of the protrusions and solids of revolution is achieved by:
    Selecting a distinct feature (e.g. the sketch of the protrusion) by aligning the mobile device to one of the standard reference planes (top, side, and front)
    Subsequently, sketching the shape of the object as seen in the aligned view (plan, elevation) or specifying the dimension of revolution by using the mobile device screen in input numerical values.
  The assembly of multiple parts into a single meaningful representation of a designed object is achieved by:
    Searching for parts from a repository using mobile menus
    Configuring each part with respect to each other by using the combination mobile tilt and touch gestures.

Embodiment 5 (e.g., MobiSweep): Use of a mobile device to detect a reference plane in a 3D interaction space defined inside a separate virtual space to create, modify, deform, and manipulate virtual objects wherein:
  The category of virtual objects includes a generalized cylinder defined by sections along a skeletal axis;
  The creation of the generalized cylinder is performed by incremental and dynamic addition of cross-sections using one finger and three finger gestures applied on the mobile device screen.
  The modification of the generalized cylinder include:
    Translating the reference plane so as to intersect a desired cylinder
    Use of finger gesture on the mobile device screen to specify the intent to select the intersected cylinder.
    Use of two finger gestures to scale the cylinder
  The deformation of the generalized cylinder include:
    Dynamically bending about the skeletal axis by rotating the top-most section of the cylinder using the rotation of the mobile device,
    Changing the shape of the top-most section of the cylinder by providing a sketch of the new section through the screen of the a section
    Scaling of a section using two finger gestures
    Deformation of a section.
  The manipulation of the generalized cylinder is achieved by:
    Translating the reference plane so as to intersect a desired cylinder Use of finger gesture on the mobile device screen to specify the intent to select the intersected cylinder Use of two finger gestures to move the cylinder Use of the mobile device's orientation to rotate the cylinder Embodiment 6 (e.g., MobiForm): Use of a mobile device to detect a reference plane for drawing on, texturing, and deforming arbitrary polygon meshes to compose 3D digital designs in a 3D virtual space displayed on a separate computing device with a display screen. The deformation is achieved by:

Rotating the smartphone so as to move the reference plane on the surface of the virtual 3D objects represented as a polygon mesh Use of one finger gesture to create inward deformation, sketched entities, and texturing Use of two finger gestures to create outward deformation on the surface of the 3D virtual objects Use of additional buttons (e.g. volume button) to switch from the modeling mode to the rotation mode and vice-versa.

Embodiment 7 (e.g., MobiSpace): Use of a mobile device as a mid-air 3D controller, without including additional hardware on the device.

Combining the tilt sensor data from a mobile device with 3D depth data acquired from an externally mounted depth sensor to track hand-held motion of the device in 3D space.

Augmenting mid-air tracking of a mobile device with concurrent multi-touch gestures on its surface to support both spatial and discrete inputs during mid-air interactions with a 3D modeling system.

Clutching and spatially manipulating virtual 3D objects.

Deforming a virtual 3D object by clutching a portion its geometry, and moving the device in the direction of elongation, compression, bending, or twisting.

Uniform or constrained scaling of virtual 3D objects.

Applying context-based constraints to interpret coarse mid-air inputs into more precise and refined modeling operations.

Beautifying assembly structure through geometric and spatial constraints between adjoining shapes.

Patterning a shape along a linear direction or the outline of an adjoining shape.

Configuring and assembling multiple objects in 3D space to compose a virtual design or art prototype.

Assembling planar shapes drawn on the mobile device GUI.

Assembling 3D shapes acquired from digital 3D scanning or a 3D model repository. (similar to before but doing it now by moving the mobile device)

Clause 1. A method for manipulating a 3D virtual object displayed in a virtual space using a mobile device having a touch screen, the method comprising: defining a reference plane in the virtual space; changing a location of the reference plane in the virtual space based at least in part on an input received by the mobile device; selecting all or part of the 3D virtual object that is intersected by the reference plane; receiving an indication of a manipulation performed on the mobile device; and modifying a representation of all or part of the 3D virtual object intersected by the reference plane based at least in part on the manipulation performed on the mobile device.

Clause 2. The method of Clause 1, further comprising rendering the virtual space on a 2D display device, a virtual reality device, or an augmented reality device.

Clause 3. The method of any of Clauses 1-2, wherein the manipulation comprises a rotation of the mobile device and the modifying the representation comprises rotating all or part of the 3D virtual object that is intersected by the reference plane.

Clause 4. The method of any of Clauses 1-3, wherein the manipulation comprises a pinch gesture on the touch screen of the mobile device and modifying the representation comprises shrinking all or part of the 3D virtual object that is intersected by the reference plane.

Clause 5. The method of any of Clauses 1-4, wherein the manipulation comprises a curve drawn on the touch screen of the mobile device and modifying the representation comprises creating a planar curve in the virtual space.

Clause 6. The method of any of Clauses 1-5, wherein the manipulation comprises a multi-touch drag gesture across the touch screen of the mobile device and modifying the representation comprises translating all or part of the 3D virtual object that is intersected by the reference plane.

Clause 7. A method for manipulating a 3D virtual object displayed in a virtual space a using a mobile device having a touch screen, the method comprising: positioning a pointer in the virtual space based at least in part on an orientation of a plane defined by the touch screen of the mobile device; correlating all or part of the 3D virtual object with a location of the pointer in the virtual space; receiving an indication of a selection command performed on the mobile phone; selecting at least a portion of the 3D virtual object correlated with the location of the pointer in response to the received indication; and receiving an indication of movement of the mobile device; and manipulating the portion of the 3D virtual object based at least in part on the indication of movement.

Clause 8. The method of Clause 7, wherein the manipulation comprises at least one of translating the portion of the 3D virtual object, rotating the portion of the 3D virtual object, or changing a viewing direction of at least the portion of the 3D virtual object.

Clause 9. A method for manipulating a 3D virtual object displayed in a virtual space a using a mobile device, the method comprising: receiving an indication of an orientation of the mobile device, the orientation of the mobile device detected by at least one of an accelerometer or gyroscope in the mobile device; receiving an indication of a position of the mobile device, the position detected by a position sensor configured to detect the position of the mobile device in space relative to the position sensor; manipulating the 3D virtual object in the virtual space based on both the orientation of the mobile device and the position of the mobile device.

Clause 10. The method of Clause 9, wherein manipulating the 3D virtual object comprises modifying geometric and spatial constraints with respect to a different 3D virtual object.

Clause 11. The method of any of Clauses 9-10, wherein manipulating the 3D virtual object comprises creating a new 3D virtual object, the creating based at least in part on a change in the position of the mobile device along a linear direction.

Clause 12. The method of Clause 11, wherein the creating a new 3D virtual object comprises creating at least one of a sweep creating a curve across multiple frames, an assembly of multiple existing 3D virtual objects, a pattern repeated shapes, or a deformation of a shape.

Clause 13. The method of any of Clauses 9-12, further comprising receiving an indication of an input received on a touch screen of the mobile device.

Clause 14. The method of any of Clauses 9-13, wherein the position sensor detects the position of the mobile device by at least one of machine vision, ultrasound, or magnetic sensing.

Clause 15. A computing apparatus, the computing apparatus comprising: a processor; and a memory storing instructions that, when executed by the processor, configure the apparatus to perform a method as described in any of Clauses 1-14.

Clause 16. A non-transitory computer-readable storage medium for manipulating a 3D virtual object displayed in a virtual space a using a mobile device, the computer-readable storage medium including instructions that when executed by a computer, cause the computer to perform a method as described in any of Clauses 1-14.

Clause 17. A method for manipulating a threeD virtual object displayed in a virtual space using a mobile device having a touch screen, the method comprising: receiving an input at the mobile device; changing a location of a reference plane in the virtual space based at least in part on the input; selecting all or part of the threeD virtual object that is intersected by the reference plane; receiving an indication of a manipulation performed on the mobile device; and modifying a representation of all or part of the threeD virtual object intersected by the reference plane based at least in part on the indication of the manipulation performed on the mobile device.

Clause 18. The method of Clause 17, further comprising rendering the virtual space on a 2D display device, a virtual reality device, or an augmented reality device.

Clause 19. The method of Clause 17 or 18, wherein the manipulation comprises a rotation of the mobile device and the modifying the representation comprises rotating all or part of the threeD virtual object that is intersected by the reference plane.

Clause 20. The method of any of Clauses 17-19, wherein the manipulation comprises a pinch gesture on the touch screen of the mobile device and modifying the representation comprises shrinking all or part of the threeD virtual object that is intersected by the reference plane.

Clause 21. The method of any of Clauses 17-20, wherein the manipulation comprises a curve drawn on the touch screen of the mobile device and modifying the representation comprises creating a planar curve in the virtual space.

Clause 22. The method of any of Clauses 17-21, wherein the manipulation comprises a multi-touch drag gesture across the touch screen of the mobile device and modifying the representation comprises translating all or part of the threeD virtual object that is intersected by the reference plane.

Clause 23. A method for manipulating a threeD virtual object displayed in a virtual space using a mobile device having a touch screen, the method comprising: receiving an indication of an orientation of a plane defined by the touch screen of the mobile device; positioning a pointer at a location in the virtual space based at least in part on the indication of the orientation; correlating at least part of the threeD virtual object with the location of the pointer in the virtual space; receiving an indication of a selection command performed on the mobile device; selecting at least a portion of the threeD virtual object correlated with the location of the pointer in response to the received indication of the selection command; receiving an indication of movement of the mobile device; and manipulating the portion of the threeD virtual object based at least in part on the indication of movement.

Clause 24. The method of Clause 23, wherein the manipulating the portion of the threeD virtual object comprises at least one of: translating the portion of the threeD virtual object, rotating the portion of the threeD virtual object, or changing a viewing direction of at least the portion of the threeD virtual object.

Clause 25. A method for manipulating a first threeD virtual object displayed in a virtual space using a mobile device, the method comprising: receiving an indication of an orientation of the mobile device, the orientation of the mobile device detected by at least one of an accelerometer or gyroscope in the mobile device; receiving an indication of a position of the mobile device, the position detected by a position sensor configured to detect the position of the mobile device in space relative to the position sensor; and manipulating the first threeD virtual object in the virtual space based on both the orientation of the mobile device and the position of the mobile device.

Clause 26. The method of Clause 25, wherein manipulating the threeD virtual object comprises modifying geometric and spatial constraints with respect to a second, different threeD virtual object.

Clause 27. The method of Clause 25 or 26, wherein manipulating the first threeD virtual object comprises creating a third, new threeD virtual object based at least in part on a change in the position of the mobile device along a linear direction.

Clause 28. The method of Clause 27, wherein the creating the third, new threeD virtual object comprises creating at least one of: a curve across multiple frames, an assembly of multiple existing threeD virtual objects, a pattern of repeated shapes, or a deformed shape.

Clause 29. The method of any of Clauses 25-28, further comprising receiving an indication of an input received on the mobile device, wherein the input comprises a rotation of the mobile device and the manipulating the first threeD virtual object comprises rotating all or part of the first threeD virtual object is the virtual space.

Clause 30. The method of any of Clauses 25-29, further comprising receiving an indication of an input received on a touch screen of the mobile device, wherein the input comprises a pinch gesture on the touch screen of the mobile device and the manipulating the first threeD virtual object comprises shrinking all or part of the first threeD virtual object.

Clause 31. The method of any of Clauses 25-30, further comprising receiving an indication of an input received on a touch screen of the mobile device, wherein the input comprises a curve drawn on the touch screen of the mobile device and the manipulating the first threeD virtual object comprises creating a planar curve is the virtual space.

Clause 32. The method of any of Clauses 25-31, further comprising receiving an indication of an input received on a touch screen of the mobile device, wherein the input comprises multi-touch drag gesture across the touch screen of the mobile device and the manipulating the first threeD virtual object comprises translating all or part of the first threeD virtual object is the virtual space.

Clause 33. The method of any of Clauses 25-32, wherein the position sensor detects the position of the mobile device by at least one of machine vision, ultrasound, or magnetic sensing.

Clause 34. A computing apparatus, the computing apparatus comprising: a processor; and a memory storing instructions that, when executed by the processor, configure the apparatus to perform a method as described in any of Clauses 17-33.

Clause 35. A non-transitory computer-readable storage medium for manipulating a 3D virtual object displayed in a virtual space a using a mobile device, the computer-readable storage medium including instructions that when executed by a computer, cause the computer to perform a method as described in any of Clauses 17-33.

CONCLUSION

The invention is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in some examples in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

What is claimed is:

1. A method for manipulating a 3D virtual object displayed in a virtual space using a mobile device having a touch screen, the method comprising:
   defining a reference plane in the virtual space;
   receiving a first input at the mobile device, the first input including at least one of a touch gesture on the touch screen and a movement of the mobile device;
   changing a location or orientation of the reference plane in the virtual space based at least in part on the first input;
   determining a selected region of a surface of the 3D virtual object by projecting the reference plane onto the surface of the 3D virtual object; and
   manipulating, using the mobile device, the selected region of the surface of the 3D virtual object.

2. The method of claim 1, the manipulating further comprising:
   receiving an indication of a second input received on the touch screen of the mobile device, wherein the second input comprises a one-finger swiping gesture on the touch screen; and
   manipulating the 3D virtual object by rotating all or part of the 3D virtual object in the virtual space based on the indication of the second input.

3. The method of claim 1, the manipulating further comprising:
   receiving an indication of a second input received on the touch screen of the mobile device, wherein the second input comprises a pinch gesture on the touch screen of the mobile device; and
   adjusting a size of the selected region of the surface of the 3D virtual object based on the indication of the second input.

4. The method of claim 1, the manipulating further comprising:
   receiving an indication of a second input received on the touch screen of the mobile device, wherein the second input comprises a curve drawn on the touch screen of the mobile device; and
   deforming, marking, or texturing the selected region of the surface of the 3D virtual object based on the indication of the second input.

5. The method of claim 1, the manipulating further comprising:
   receiving an indication of a second input received on the touch screen of the mobile device, wherein the second input comprises multi-touch gesture on the touch screen of the mobile device; and
   deforming the selected region of the surface of the 3D virtual object based on the indication of the second input.

6. The method of claim 1, further comprising rendering the virtual space on a 2D display device, a virtual reality device, or an augmented reality device.

7. A method for manipulating a 3D virtual object displayed in a virtual space using a mobile device having a touch screen, the method comprising:
   receiving an indication of an orientation of the mobile device;
   positioning a pointer at a location in the virtual space based at least in part on the indication of the orientation, the pointer comprising a cone extending from the mobile device; and
   manipulating, using the mobile device, at least a portion of the 3D virtual object correlated with the location of the pointer, the portion being an intersection of the cone and a surface of the 3D virtual object.

8. The method of claim 7 further comprising:
   receiving an indication of a selection command performed on the mobile device; and
   selecting the portion of the 3D virtual object correlated with the location of the pointer in response to the received indication of the selection command.

9. The method of claim 7, wherein the manipulating the portion of the 3D virtual object comprises at least one of (i) translating at least the portion of the 3D virtual object, (ii) rotating at least the portion of the 3D virtual object, and (iii) changing a viewing direction of at least the portion of the 3D virtual object.

10. The method of claim 7, further comprising rendering the virtual space on a 2D display device, a virtual reality device, or an augmented reality device.

11. A method for manipulating a 3D virtual object displayed in a virtual space using a mobile device having a touch screen, the method comprising:
    defining a reference plane in the virtual space that intersects a portion of the 3D virtual object in the virtual space;
    receiving an indication of a manipulation performed on the mobile device; and
    deforming the 3D virtual object by moving a portion of the 3D virtual object that is intersected by the reference plane based on the indication of the manipulation performed on the mobile device.

12. The method of claim 11, wherein:
    the manipulation comprises a rotation of the mobile device; and
    the deforming the 3D virtual object comprises rotating the portion of the 3D virtual object that is intersected by the reference plane based on the rotation of the mobile device.

13. The method of claim 11, wherein:
    the manipulation comprises a pinch gesture on the touch screen of the mobile device; and the deforming the 3D virtual object comprises scaling the portion of the 3D virtual object that is intersected by the reference plane based on the pinch gesture.

14. The method of claim 11, wherein:
the manipulation comprises a dragging or sliding gesture across the touch screen of the mobile device; and
the deforming the 3D virtual object comprises translating the portion of the 3D virtual object that is intersected by the reference plane based on the dragging or sliding gesture.

15. The method of claim 11 further comprising:
receiving a first input at the mobile device; and
changing a location or orientation of the reference plane in the virtual space based at least in part on the first input.

16. The method of claim 15, wherein the first input including a multi-touch gesture on the touch screen including dragging, sliding, or pinching.

17. The method of claim 11, further comprising rendering the virtual space on a 2D display device, a virtual reality device, or an augmented reality device.

\* \* \* \* \*